United States Patent [19]
Asai et al.

[11] Patent Number: 6,018,366
[45] Date of Patent: Jan. 25, 2000

[54] VIDEO CODING AND DECODING SYSTEM AND METHOD

[75] Inventors: Kohtaro Asai; Takahiro Fukuhara; Tokumichi Murakami, all of Tokyo, Japan

[73] Assignee: Mitsubishi Denki Kabushiki Kaisha, Tokyo, Japan

[21] Appl. No.: 08/766,179

[22] Filed: Dec. 12, 1996

[30] Foreign Application Priority Data

Dec. 27, 1995 [JP] Japan ................................ 7-340871
Oct. 11, 1996 [JP] Japan ................................ 8-269669

[51] Int. Cl.[7] .......................... H04N 7/12; H04N 11/02; H04N 11/04
[52] U.S. Cl. .................. 348/394; 348/403; 348/395; 382/232
[58] Field of Search .................... 348/405, 394, 348/408, 699, 409, 404, 413, 415, 412, 441, 442, 444, 450, 395, 403; 358/455, 133; 382/232, 17, 56; H04N 7/12, 11/02, 11/04

[56] References Cited

U.S. PATENT DOCUMENTS

| | | | |
|---|---|---|---|
| 4,903,317 | 2/1990 | Nishihara et al. | 382/56 |
| 5,046,071 | 9/1991 | Tanoi | 375/27 |
| 5,262,854 | 11/1993 | Ng | 358/133 |
| 5,363,213 | 11/1994 | Coward et al. | 358/455 |
| 5,453,787 | 9/1995 | Hancock et al. | |
| 5,506,916 | 4/1996 | Nishiara et al. | 382/232 |
| 5,526,052 | 6/1996 | Ar | 348/405 |
| 5,543,846 | 8/1996 | Yagasaki | 348/415 |
| 5,572,258 | 11/1996 | Yokoyama | 348/415 |
| 5,576,772 | 11/1996 | Kondo | 348/699 |
| 5,600,737 | 2/1997 | Murakami et al. | 382/232 |
| 5,657,086 | 8/1997 | Tahara et al. | 348/412 |
| 5,764,294 | 6/1998 | Fukuda et al. | 348/394 |

FOREIGN PATENT DOCUMENTS

| | | |
|---|---|---|
| 0 447 203 A2 | 9/1991 | European Pat. Off. . |
| 0 605 165 A2 | 7/1994 | European Pat. Off. . |
| WO 93/07720 | 4/1993 | WIPO . |

OTHER PUBLICATIONS

ISO/IEC 13818–2 MPEG 2 video (abstract), Journal of Television Society (of Japan), vol. 49, No. 4, pp. 435–466 (1995), with partial English language translation.

*Primary Examiner*—Tommy P. Chin
*Assistant Examiner*—Tung Vo
*Attorney, Agent, or Firm*—Burns, Doane, Swecker & Mathis, LLP

[57] ABSTRACT

A video encoder for quantizing format-transformed source input-pictures into quantized data, and for coding the quantized data into coded bitstream, for outputting the coded bitstream, comprises a plural-density format-transformer for transforming a source input-picture into a specific format-transformed source input-picture; and a detector for detecting a variation in one of a specific luminance and color difference signal, and for selecting the specific format-transformed source input-picture for input to the quantizer depending on the variation. A decoder having a corresponding configuration is also provided.

18 Claims, 27 Drawing Sheets

VIDEO CODING AND DECODING SYSTEM AND METHOD

BACKGROUND OF THE INVENTION

1. Field of the Invention

This invention relates to a video coder which encodes source input pictures and a video decoder which decodes coded video bitstream very effectively, and provides a system for effective transmission or storage of the pictures.

2. Description of the Related Art

A conventional representative high efficient video coder is disclosed in MPEG2, an international standard video layer discussed in ISO/IEC JTC1/SC29/WG11. For example, in the April, 1995, issue of "Picture Information Engineering and Broadcasting Technique Television Academy Bulletin", MPEG is featured as a topic theme. On pages 29 to 60 of this bulletin, a coding system of MPEG2 is discussed, referred to therein as "3-2 video compression". Hereinafter, a conventional high efficient coding system is described based on the above identified related art.

FIG. 25, comprising FIGS. 25(a), 25(b) and 25(c) shows an explanatory view of a picture format including sample density rate of luminance and color difference signals. There are three formats in MPEG2, comprising 4:2:0, 4:2:2, or 4:4:4. However, one selected format is not dynamically changed during encoding or decoding.

Furthermore, the 4:4:4 format is defined as a format in MPEG2 as of November 1995. However, it is not defined in a class called profile. That is, it is practically an unused format. In either of the 4:2:0 or 4:2:2 formats, the sample density of the color difference signal is lower than that of the luminance signal. The reason for this is that the discrimination ability of a human being for resolution of luminance is much higher than that of color difference.

FIG. 26 shows a basic configuration of a MPEG coder discussed above. In the figure, an A/D convertor 1, a selector for selecting one of an inter-frame mode and intra-frames mode 16, a Discrete Cosine Transformer (DCT) 4, a quantizer 5, a variable length coder 6, a transmission buffer 7 and a rate controller 8 are provided. A dequantizer 11, an inverse DCT 12, an adder 17, a frame memory 18, and a motion compensated predictor 19 are further provided, forming an added loop comprising a predictive coding means.

FIG. 27 shows a basic configuration of a MPEG decoder of the type discussed above. In the figure, a receiving buffer 9, a variable length decoder 10, a dequantizer 11, an inverse DCT 12, a format convertor 30, and a D/A converter 14 are provided. A frame memory 18, a motion compensated predictor 24, and an adder 17 are further provided, forming a predictive decoding means. DCT transform coefficients 104, quantized index of transform conversion coefficients 105, coded video stream 107, a signal showing the volume of generated information 108, a quantized index 109 showing the decoded form of transform coefficient, a dequantized transform coefficient 110, input picture data 116, predicted residual error picture data 119, decoded picture data 120, motion compensated prediction data 125 and a motion vector 126 are further illustrated in FIGS. 26 and 27.

The operation of the coder of FIG. 26 is described. A source of input pictures are digitized at the A/D convertor 1. This source of input pictures is coded according to DCT and coded with motion compensated prediction. The difference between the input picture data 116 and the motion compensated prediction picture data 125 generated according to motion prediction from a reference picture is obtained and predicted residual error data 117 results therefrom. The predicted residual error in each 8 by 8 macroblock is transformed into transform coefficient 104 in the frequency domain through DCT 4. Then, quantizing is performed using a quantizer 5.

In case of intra-frame coding without motion compensated prediction, the input picture data 116 are directly DCT-coded. Selecting between inter-frame and intra-frame is performed by the selector 16. Since data is used as a reference picture of motion compensated prediction, quantized data 105 is dequantized at the dequantizer 11 and inverse DCT is performed for the information 105 at the inverse DCT module 12. Then, the signal 118 is added to the motion compensated prediction signal 119 by the adder 17. The reference picture is decoded by local decoding and stored in the frame memory 18.

Each 8 by 8 block of DCT coefficients are scanned consecutively from the low frequency components to the high frequency components after one dimensional quantizing. Then, variable length coding is performed at the variable length coder 6 for one dimensional-quantized DCT coefficients and the other coded data like motion vector. For keeping the volume of coded video bitstream stable, a signal showing a volume of generated information 108 from the output buffer 7 is monitored, and the quantizer is controlled through the rate controller as a feedback loop. The coded video stream 107 is obtained from the buffer 7.

The operation of the decoder in FIG. 27 is now described.

The decoding process is basically a reverse operation of the coder. First, the coded video bitstream 107 is stored in the buffer 9. Data in the buffer 9 is read out and decoding is performed at the variable length decoder 10. In this process, signals 109 of DCT coefficients, and motion vectors 126 are decoded and separated. Each 8 by 8 block of DCT coefficients 109 is dequantized by the dequantizer 11 and transformed to picture element data 118 at the inverse DCT module 12. In case of intra-frame coding, the decoded picture can be obtained at this stage.

When motion compensated prediction is performed, current picture data is obtained by adding the motion compensated prediction data 119 based on motion compensated prediction from a reference picture to the output of inverse DCT module 12. The current picture data are stored in a frame memory 18 for a new reference picture.

The above example typifies conventional systems. In this example, coding of an input picture is based on macroblock DCT, wherein sample density rate of luminance and color difference signals are fixed at 4:2:0, or 4:2:2, during the coding. Based on the results of such coding, the following observations may be made. As a principle of operation, degradation of picture quality according to compression is observed in macroblock units. This is because distortion caused in a spatial transform coefficient, according to quantizing, spreads over the whole macroblock according to inverse DCT. Further, this degradation can be observed to emerge clearly in color difference signals. This is because the sample density of the color difference signal is generally lower than that of the luminance signals. If the sample density of the color difference signals is increased, the color distortion is especially improved. On the other hand, the volume of the coding increases, which negatively impacts the compression efficiency.

The present invention solves these and other problems. It is an object of the invention to provide a video coder and a video decoder which reduce color distortion, which provides output which is clear when the compression rate is increased, and can get a higher qualified coding picture without lowering the compression efficiency.

SUMMARY OF THE INVENTION

According to one of the aspect of the invention,

A video encoder, having a quantizer for quantizing format-transformed source input-pictures into quantized data, and having a coder for coding the quantized data into a coded bitstream, and for outputting the coded bitstream, comprises:

a first plural-density format-transformer for transforming a source input-picture into a specific format-transformed source input-picture, and for inputting the specific format-transformed input-picture into the quantizer.

According to another aspect of the invention,

A video decoder, having a decoder for decoding an input coded bitstream into quantized coefficient data, and having a dequantizer for dequantizing the quantized coefficient data into decoded macroblock data, and for generating reconstructed output pictures from the decoded macroblock data, comprises:

a first plural-density format-transformer for transforming the decoded macroblock data into specific decoded macroblock data.

According to another aspect of the invention,

A method for encoding source input-pictures into a coded bitstream for output, comprises the steps of:

transforming said source input-picture into format-transformed source input pictures using a first plural-density format-transformer;

detecting a characteristic of one of a luminance and color difference related component, and in response to said detecting, selecting specific format-transformed source input-pictures from said plural-density format-transformer for input to a quantizer;

quantizing, at said quantizer, said specific format-transformed source input to a quantized data; and coding the quantized data into a coded bitstream for output.

According to another aspect of the invention,

A method for decoding an input coded bitstream into reconstructed output pictures, comprises the streams of:

receiving an input coded bitstream;

decoding, using a decoder, said input coded bitstream into quantized coefficient data;

dequantizing, using a dequantizer, the quantized coefficient data into decoded macroblock data;

transforming, using a first plural-density format-transformer, said decoded macroblock data into specific decoded macroblock data.

Other objects features, and advantages of the invention will be apparent from the following description when taken in conjunction with the accompanying drawings.

DETAILED DESCRIPTION

Embodiment 1

A concrete applied example of the present invention, entails the use of a digital video transmission system, a digital storage media and so forth, which may be associated with a satellite, ground wave, and wire communication network.

Figure 1:
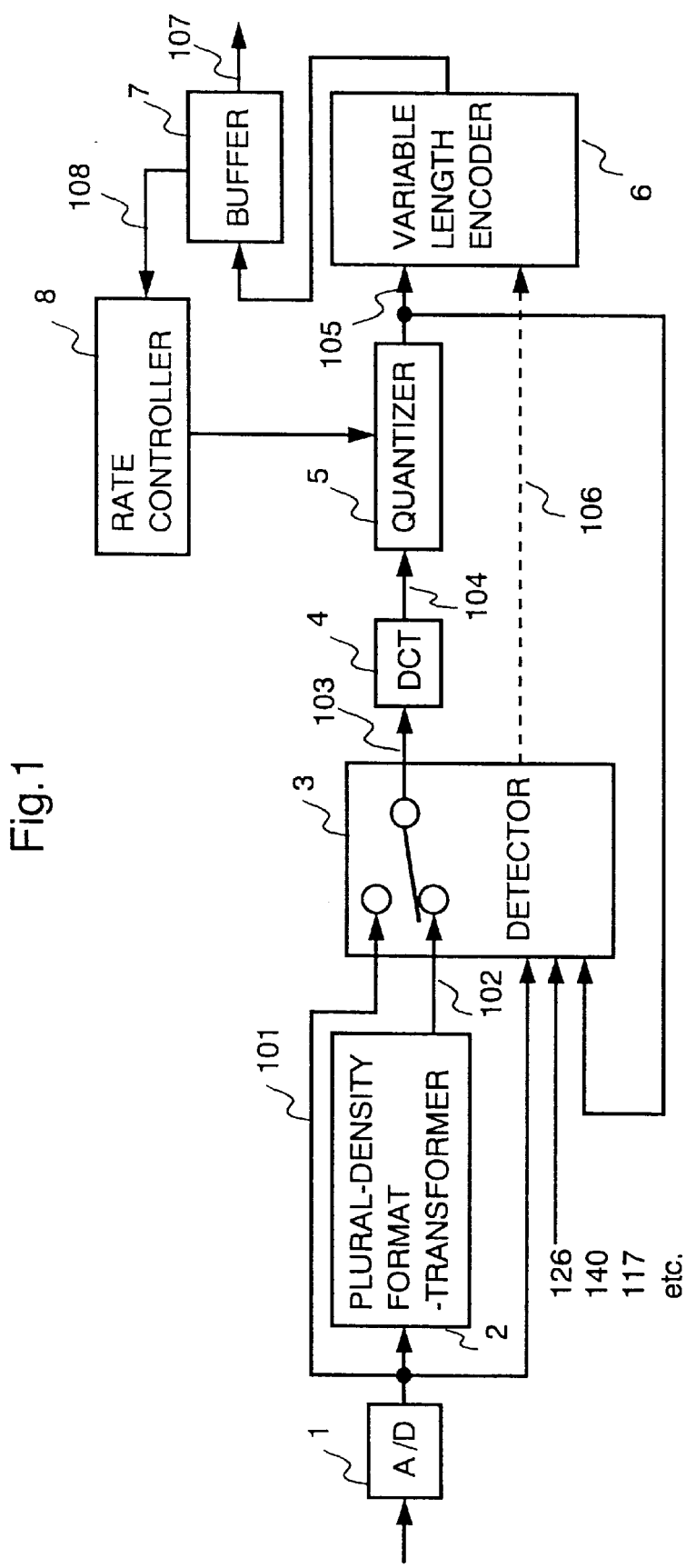
FIG. 1 shows a block diagram of a basic video encoder of Embodiment 1 of the present invention.

Hereinafter, embodiments of a highly efficient video coder and decoder according to the present invention are explained with reference to the figures. FIG. 1 shows a configuration of a basic video coder in a case where a predictive encoding loop containing motion compensation is not provided. FIG. 1 employs, as one new element, a local format-transformer (plural-density format-transformer) 2 and a detector 3. An A/D converter 1, a Discrete Cosine Transformer 4, a quantizer 5, a variable length coder 6, a buffer 7 and a rate controller 8 are equivalent to those elements of the conventional system discussed above. A digitized video data (source input picture) 101, a video data locally format-transformed signal 102, a video data 103 (in which the format is dynamically switched), DCT transform coefficients 104, a quantized index 105 (quantized video data) of transform coefficients, format switching information 106, a coded video bitstream 107 and a signal 108 showing a volume of the generated information are provided.

Next, the operation of FIG. 1 is described.

Figure 2:
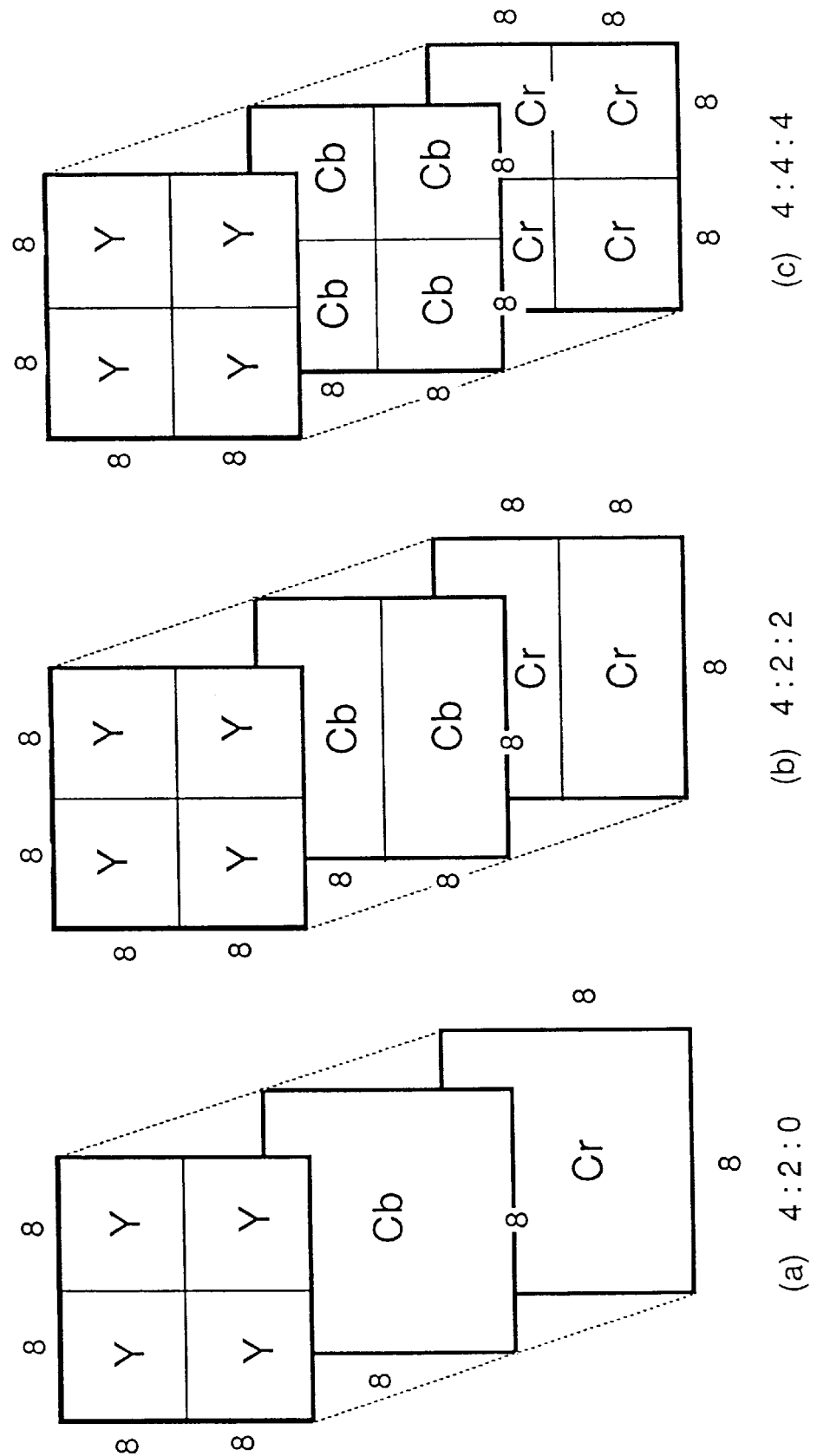
FIG. 2(*a*), 2(*b*), 2(*c*) show a sample format of a luminance signal and a color difference signal of 8 by 8 blocks.

In the present embodiment, the DCT coding system is used. Input video data (source input picture) is digitized at an A/D convertor 1 and is format-transformed. At this time, a format of the video data 101 is assumed to be a format 4:4:4 of FIG. 25(c). Namely, the sample density of luminance signals and that of color difference signals are equal. This video data is transformed to another format-transform, for example, a video data of 4:2:0 format of FIG. 25(a) using the local format-transformer (plural-density format-transformer) 2. Since a sample density signal of 4:2:0 format is lower, compared to that of the 4:4:4 format, the total number of samples to be coded becomes smaller and the compression efficiency rises. On the other hand, there is a chance of the color distortion spreading over a wide domain of the video. The video data of 4:4:4 format and the video data of 4:2:0 format are dynamically switched at the detector 3 in a block unit or in plural block units, and thus coding is performed. FIG. 2 shows a configuration of macroblock consisting of blocks of blue and red color difference signals (Cb, Cr) equally positioned as four luminance signals (Y) of 8 by 8 macroblocks. A macroblock is an example of a unit on which switching is performed.

Figure 3:
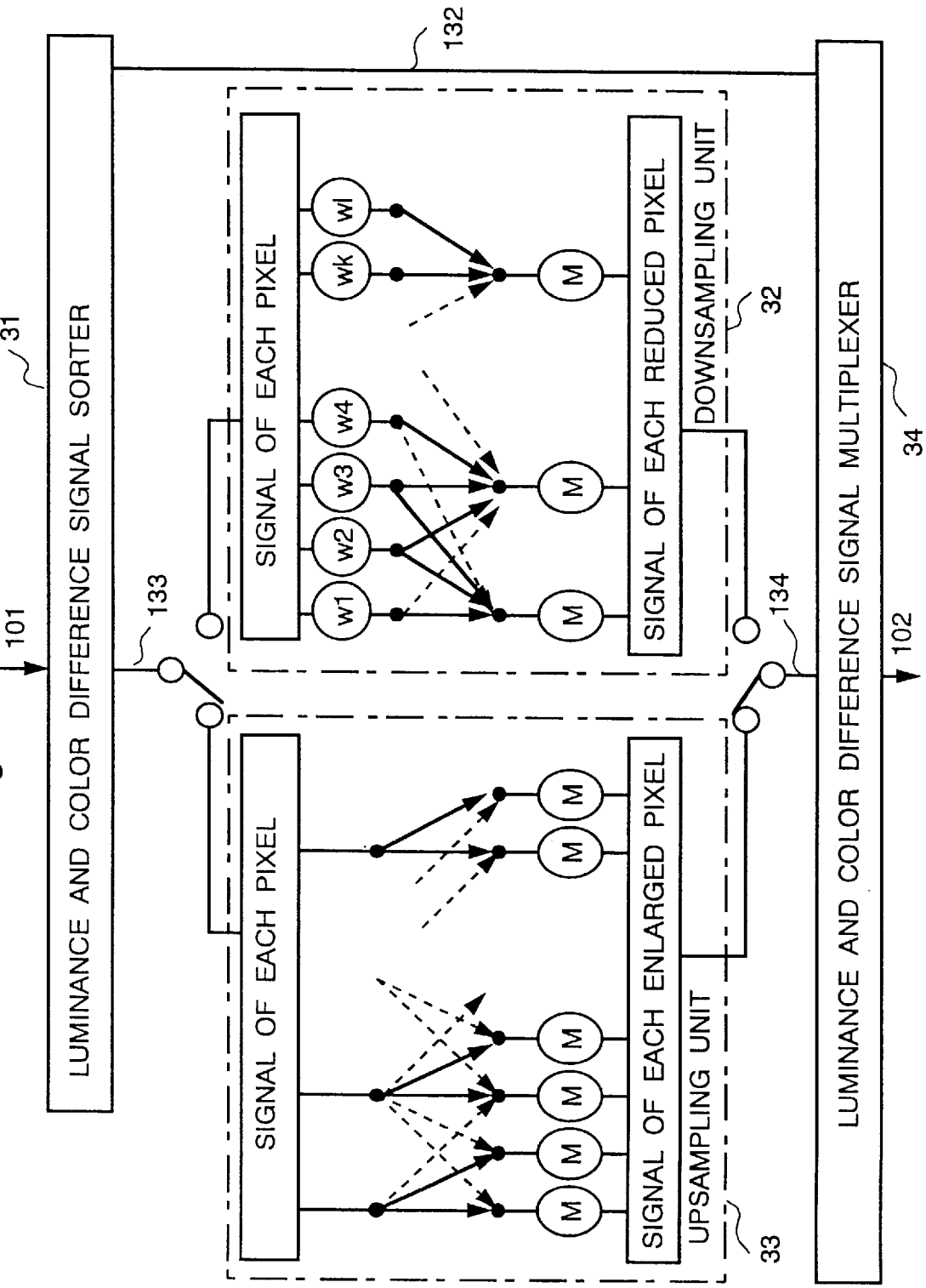
FIG. 3 shows an example of a local format-transformer of FIG. 1.

FIG. 3 to FIG. 6 show an example of the local format-transformer 2. In FIG. 3, multiplexed luminance and color difference signals are generated by first sorting input video data 101 into luminance signal 132 and color difference signal 133 at a luminance and color difference sorter 31. The color difference signal 133 is downsampled at a color difference signal downsampling unit 32 or upsampled at a color difference signal upsampling unit. The color difference signal 134, which is format-transformed according to the above process, is multiplexed at a luminance and color difference signal multiplexer 34 with the luminance signal 132, and a multiplexed signal, i.e., plural-density format-transformer output signal 102, is output.

Therefore, in the above embodiment, at the local format-transformer 2, 4:4:4 format is transformed to 4:2:0 format. As a result, in FIG. 3, the color difference signal downsampling unit 32 is selected and downsized signal is output.

Since a structure of the luminance and color difference signal sorter 31 and the luminance and color difference signal multiplexer 34 will be apparent to those skilled in the art, a minute description is omitted. A detailed operation of the color difference signal downsampling unit 32 is explained next.

In the luminance and color difference signal sorter 31, the sorted color difference signal 133 is sorted to pixel level.

When 4:4:4 format of FIG. 2(c) is downsampled to 4:2:0 format of FIG. 2(a), Cb, Cr signals are both 16×16 to 8×8 pixels. When the signal of the neighboring pixel is considered and downsampling is performed, the mean value detector shown as M of FIG. 3 inputs two pixel values and outputs downsampled and reduced new 8×8 pixels. For example, there is shown a case where two pixels are downsampled to one pixel. A coefficient w1 is multiplexed for the first pixel, and a coefficient w2 is multiplexed for the second pixel. Then, a mean value is calculated at the mean detector. When the two pixel values are p1 and p2, the mean value=$(p1*w1+p2*w2)/(w1+w2)$.

Next, the mean value output from each mean value detector is output from the downsampling unit 32. Then, the output is multiplexed by the color difference signal multiplexer.

In the above description, it is possible to vary the filter coefficient w and to perform arbitrary downsampling such as ¼ downsampling, instead of ½ downsampling.

Next, a detailed operation of the color difference signal upsampling unit 33 is explained. In the figure, M shows the mean value detector.

In FIG. 3, this is a case where one to two upsampling is performed. Namely, the original one pixel is enlarged to two pixels. First, since pixels sorted at the luminance and color difference signal sorter 31 are all repeatedly used, outputs of each pixel have two or more outputs. (Since the same pixel is repeatedly used twice, another structure can be thought.) Next, the color difference signal sorted at the color difference signal sorter is output from each pixel output and the mean value is detected at the mean value detector. As shown by the dotted lines, when the pixel value is given from the original plural pixel for the enlarged new pixel, a mean value of color difference signal can be obtained. In this case, a coefficient as shown in the example of the downsampling unit 32 can be multiplexed. The pixel signal of the mean value output from each mean value detector M is multiplexed by each specific block at the luminance and color difference signal multiplexer. Then, it is output from the plural-density format-transformer 2.

The details of the detector 3 which selects one of the picture data 102 after upsampling or downsampling, and the original video data 101 will be described later. Since the inputs of the detector 3 vary according to various embodiments, each operation of the detector 3 will be described in the corresponding embodiments which follow.

Figure 4:
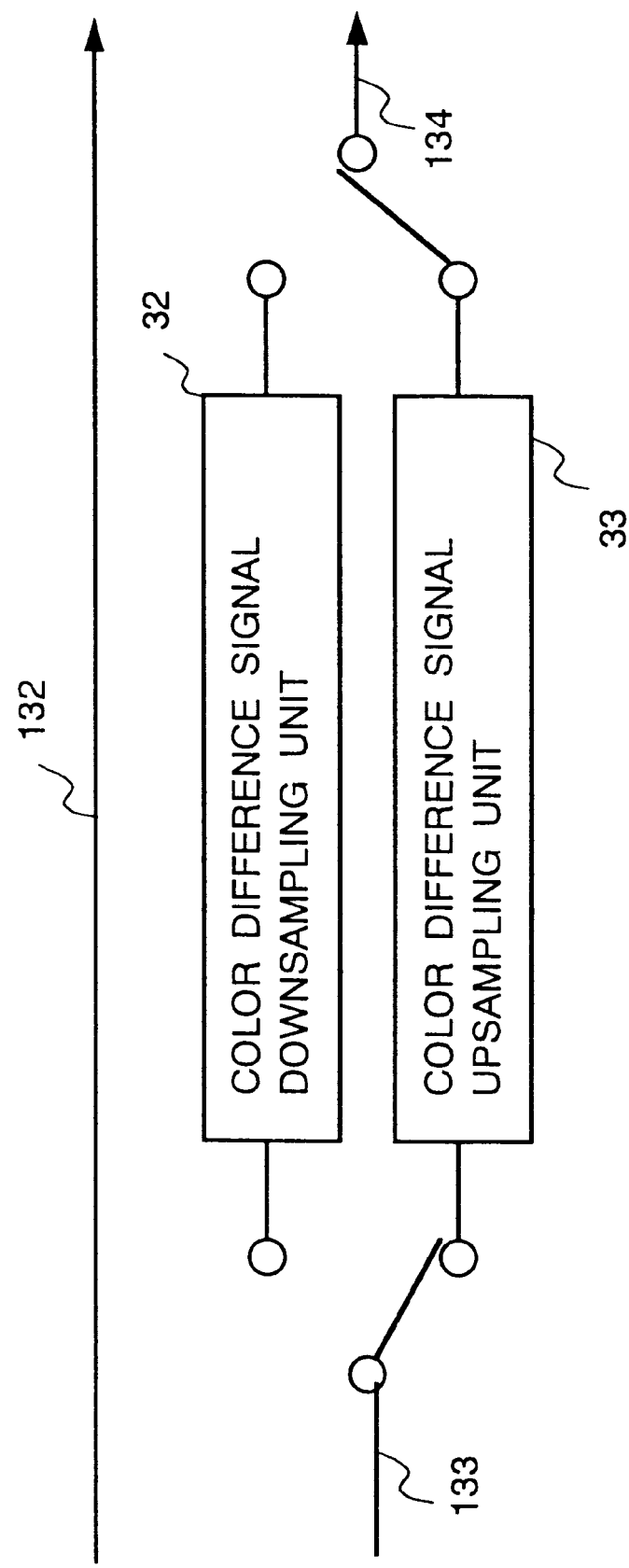
FIG. 4 shows an example of a local format-transformer of FIG. 1.
Figure 5:
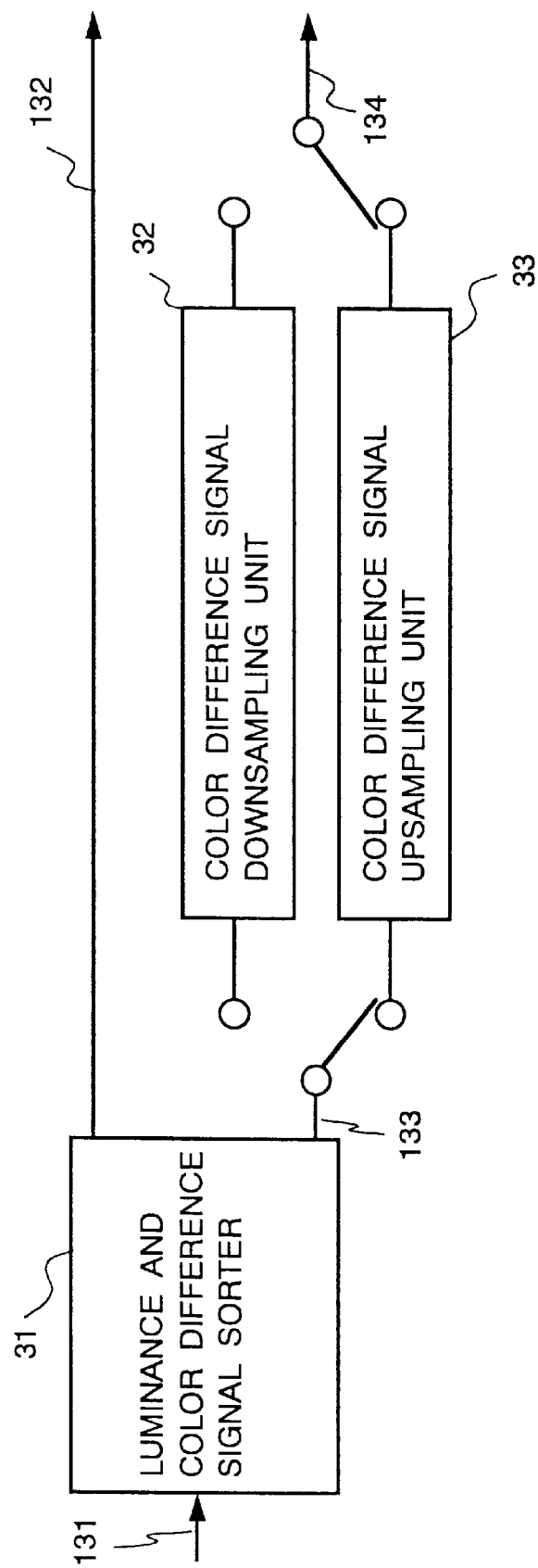
FIG. 5 shows an example of a local format-transformer of FIG. 1.
Figure 6:
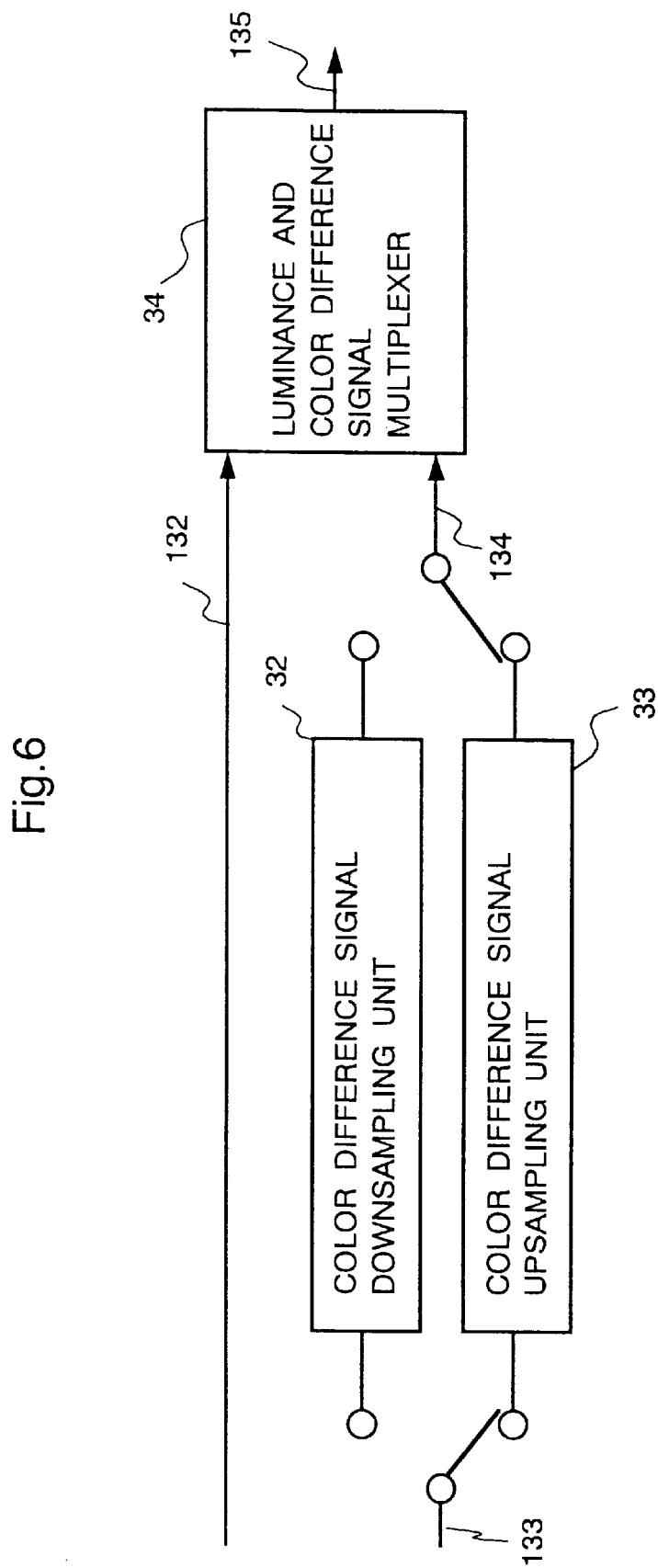
FIG. 6 shows an example of a local format-transformer of FIG. 1.

In the above embodiment, in input and output of the local format-transformer 2, both luminance signal and color difference signal are multiplexed. However, when both signals are originally sorted, a luminance and color difference signal sorter 31 and a color difference signal multiplexer 34 of FIG. 3 are not required. In this case, the configuration is as shown in FIG. 4. There can be a case where the luminance and color difference sorter 31 are both required for the circuit, or a case where only the color difference signal multiplexer 34 are required. FIG. 5 and FIG. 6 correspond to the above examples. The configuration of the local format-transformer 2 is the same as each embodiment of the following present invention.

When any format is chosen, video data is transformed to a DCT transform coefficient 104 in a frequency domain using DCT 4 in units of each 8 by 8 macroblock. Then, quantizing of the DCT transform coefficient is performed at the quantizer 5. After quantizing, the quantized index 105 is scanned consecutively from low frequency components to high frequency components in a one dimensional manner, and a variable length coding is performed at the variable length coder 6. In each unit to select formats, an information 106 to show which format (4:4:4 or 4:2:2 or 4:2:0) is chosen (format switching information 106) is multiplexed as a part of the coded information. After coded data is temporarily stored in the buffer 7, the coded data is output as the coded video bitstream 107.

When a variable volume of generated information is kept stable, the signal showing the volume of generated information 108 is recognized by monitoring the output buffer 7, and quantizing control is performed according to the feedback.

Here, in the present embodiment, DCT coding is used. Other coding systems such as a subband coding can be applicable to the present invention. Further, in the present embodiment, output of the local format-transformer and the original data are selected by the detector 3. In one configuration, where the local format-transformer itself selects the processed contents, the contents are not changed.

Having high precision processing ability, the video decoder performs upsampling for the color difference signal at least internally. Then, image signal 102 (equal to image signal 103 in this case) is output from the local format-transformer 2 using the input video data 101.

In fact, at least one bit is needed as an output selection bit of the detector 3, and the selection bit is not required in case of the specific outputs. Then, a color difference signal of high precision can be obtained.

Figure 7:
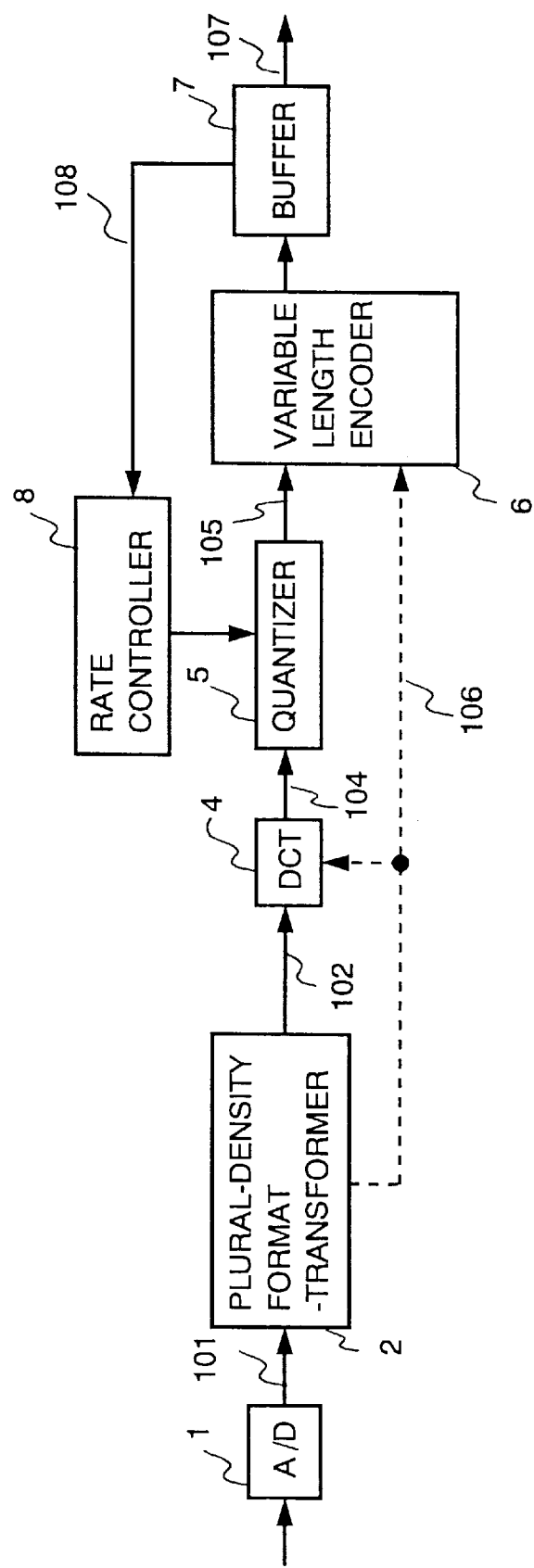
FIG. 7 shows another block diagram of a video encoder of Embodiment 1 of the present invention.

This configuration is shown in FIG. 7.

According to the picture coding unit as shown in FIG. 7, the format-transform signal 130 is output from the local format-transformer 2. The DCT 4 performs DCT transformation for the format-transformed signal. The present configuration is applicable to the configuration including a coder loop and it is also applicable to the decoder side.

Embodiment 2

Figure 8:
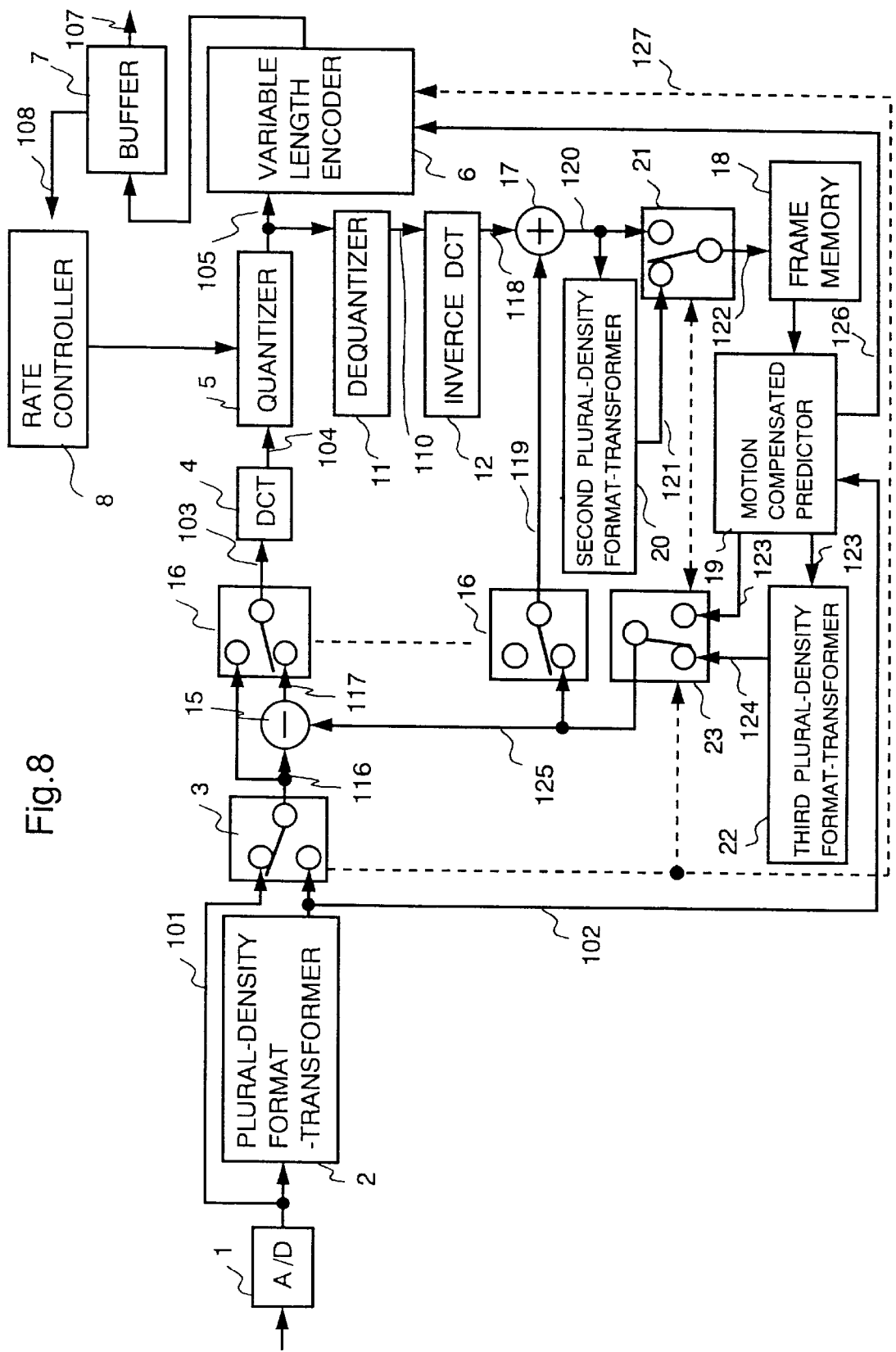
FIG. 8 shows a block diagram of a video encoder having a prediction coder loop according to Embodiment 2.

FIG. 8 is a configuration of the video coder having a prediction coder loop containing motion compensation. In the figure, as one new element, a second local format-transformer (plural-density format-transformer) 20, a selector 21, which is another output part of the detector 3, a third local format-transformer (plural-density format-transformer) 22, a selector 23, which is another output part of the detector 3, are provided. (The selector 21 and the selector 23 may be included in the detector 3.) The other elements, a subtractor 15, a frame selector 16 selecting an inter-frame/intra-frames, an adder 17, a frame (video) memory 18 for memorizing a reference picture, a motion compensated predictor 19 for motion compensated vector detection and motion compensation are similar to those described above with reference to the conventional system.

A video data 116, where a format is adaptably switched, a predicted residual error data 117, a video data 118 which is converted back to a time domain of picture elements according to inverse DCT, a predicted partial data 119, a decoded picture 120, a locally format-transformed picture 121, a reference picture 122 in which format-transformer is unified, a picture data 123 read from the motion compensated prediction 19 after motion compensation, an output of the locally format-transformed video data 124, a motion compensated prediction data 125, a motion vector 126 and a format selective information 127, are provided. The other elements are similar to the like-numbered elements already described.

Next, the operation of FIG. 8 is described.

Figure 25:
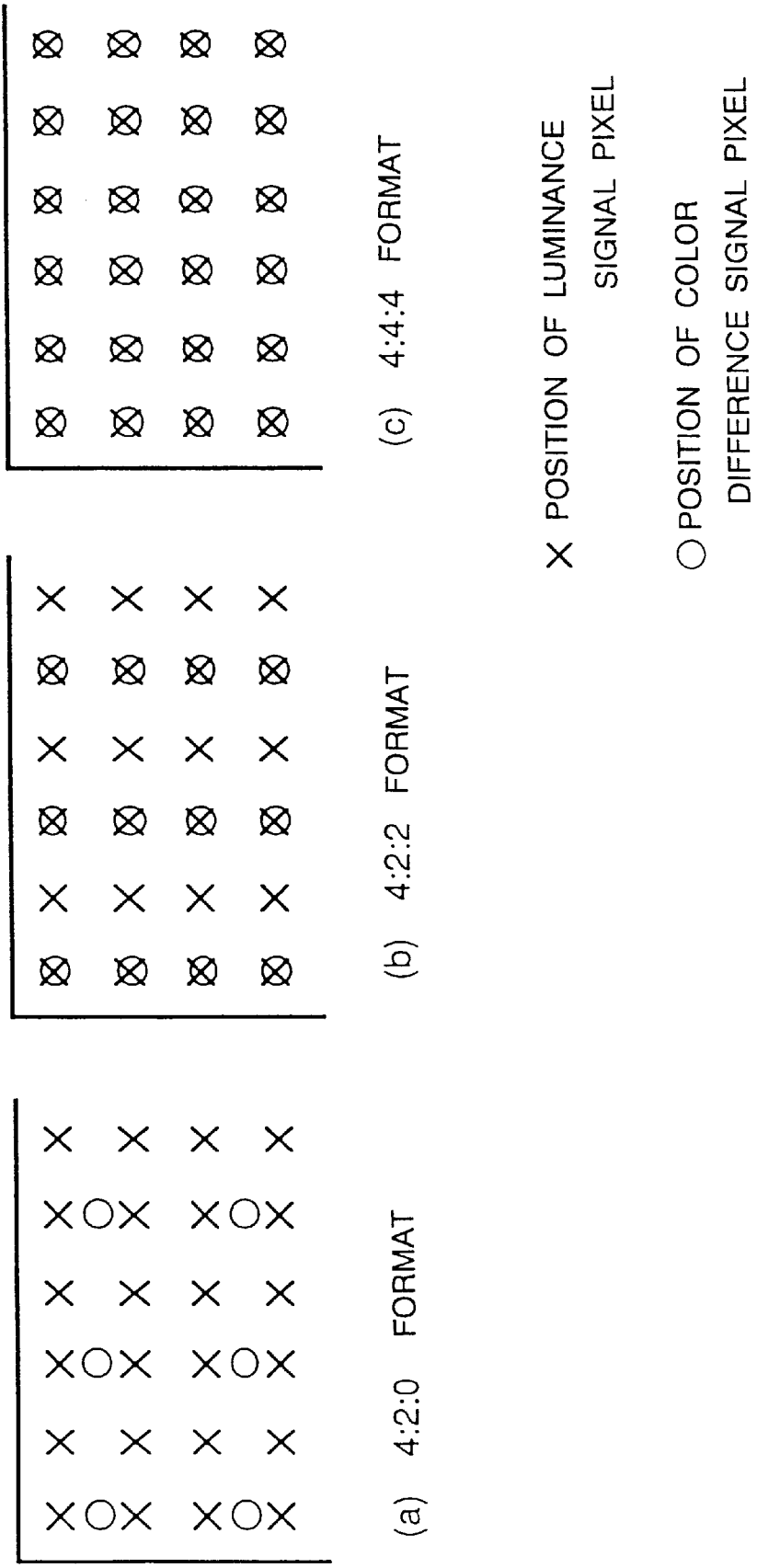
FIG. 25, comprising FIGS. 25(*a*), 25(*b*) and 25(*c*), shows an explanatory view of a video format in a video encoding system of video compression.
Figure 26:
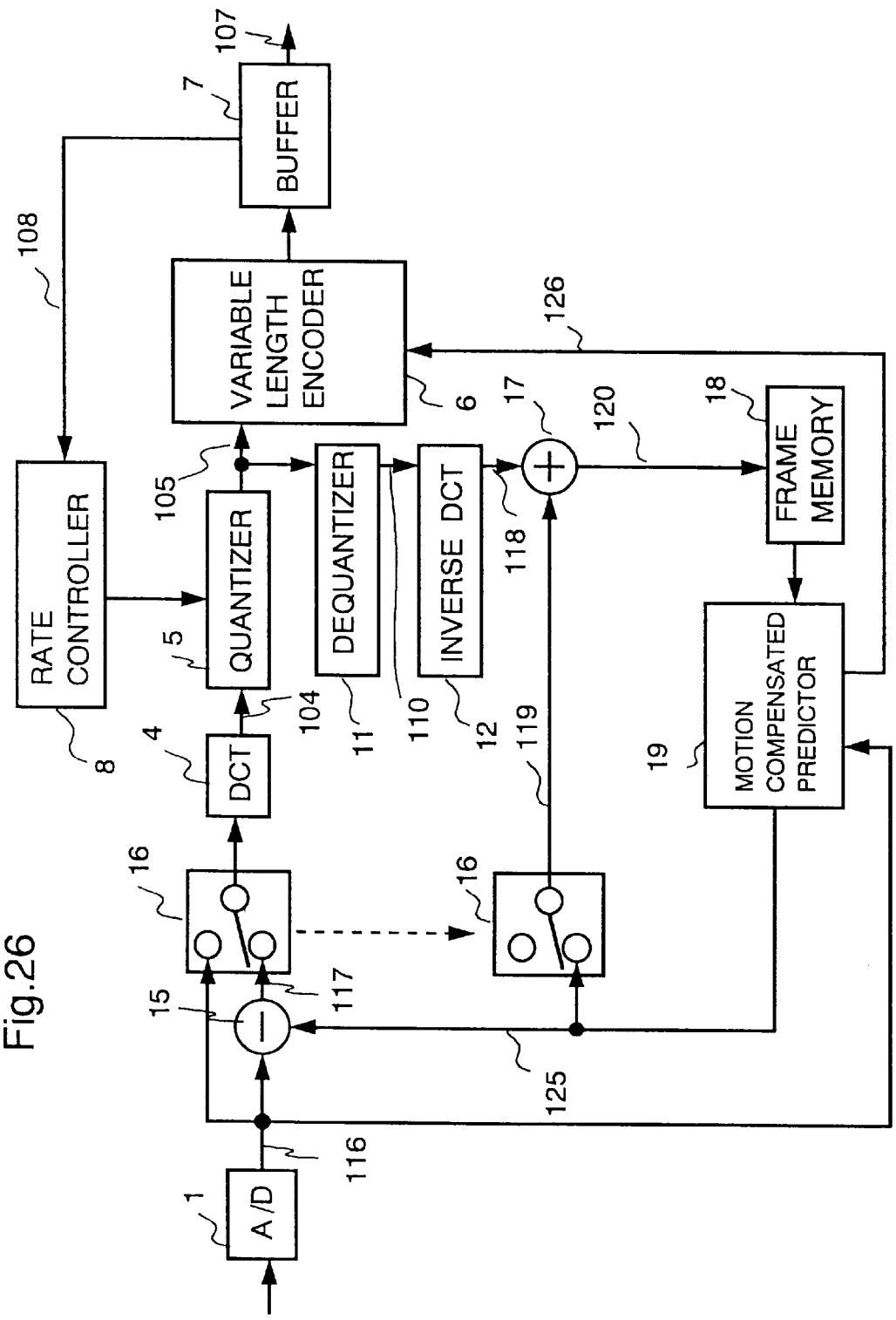
FIG. 26 shows a block diagram of a conventional video encoder; and, FIG. 27 shows a configuration block diagram of a conventional video decoder.
Figure 27:
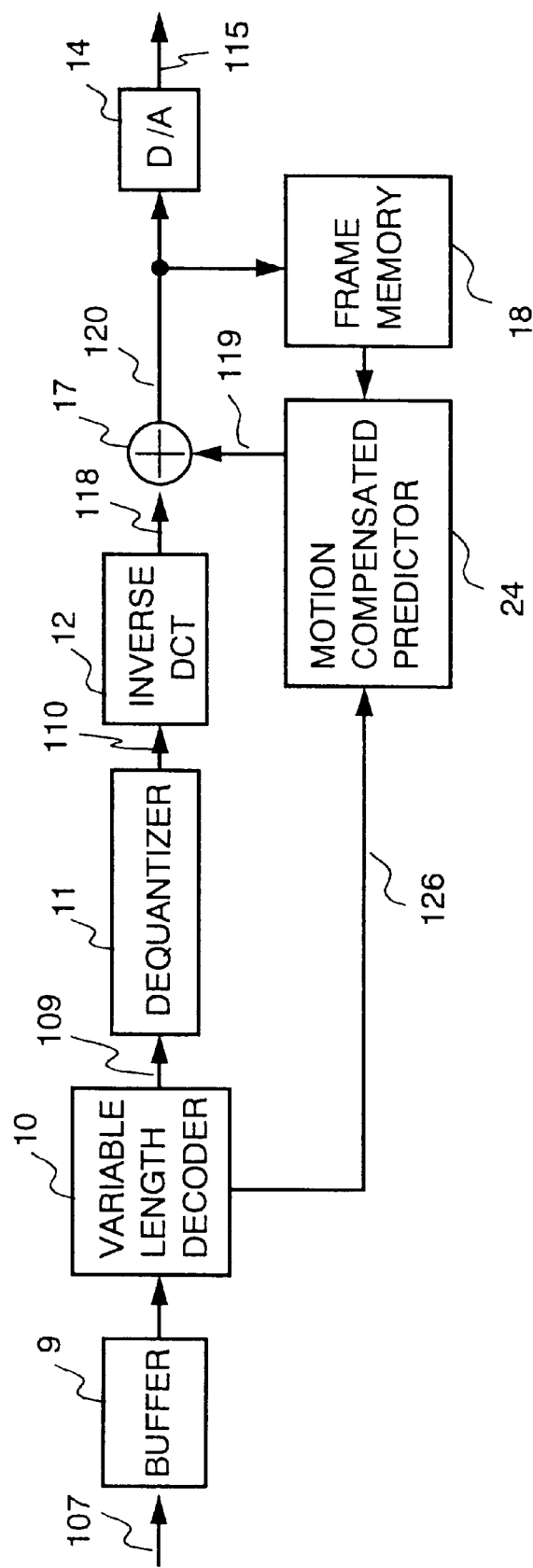

In the embodiment of FIG. 8, motion prediction and DCT coding techniques are used. After the input video data is digitized at the A/D convertor 1, format-transformation is performed. Now, the format of the video data 101 is assumed to be the 4:4:4 format as shown in FIG. 25(c). That is, the sample density of the luminance signal and that of the color difference signal are equal. The video data 101 is transformed to another format, such as a picture data 102 of 4:2:0 format of FIG. 25(a), using to a local format-transformer 2. The sample density of the color difference signal of the 4:2:0 format is lower than that of the 4:4:4 format. Therefore, the total number of samples to be coded is made small and the compression efficiency is improved. On the other hand, there is a possibility of the color distortion spreading over a wide range of the picture. The coding process should be performed with the video data of the 4:4:4 format and the 4:2:0 format being dynamically switched, for example, in a block unit or plural block units, at the detector 3.

In order to get a differential signal between the input video data 116, after selection at the detector 3, and the motion compensated prediction data 125, generated according to motion prediction from a reference picture, and in order to obtain the predicted residual error data 117, a format of an input picture data 116 and that of the motion compensated prediction data 125 should be the same. Therefore, for the motion compensated prediction data read out from the frame memory 18 as the reference picture, the third local format-transformer 22 and the selector 23 arrange the format. For instance, when a format of a reference picture stored in the frame memory 18 is assumed to be a format of 4:2:0 as a result of considering the efficiency important, the third local format-transformer 22 raises the sample density, for example.

After matching the format and getting the predicted residual error data 117, the video data 103 is transformed to a transform coefficient 104 of a frequency domain using the DCT 4 in each 8 by 8 macroblock. At a quantizer 5, quantizing of the transform coefficient is performed. In order to be used as a reference picture of the motion compensated prediction later, the quantized information 105 is dequantized at the dequantizer 11. After inverse DCT transformation, the video data 118 is obtained and is added to the predicted partial data (motion compensated prediction signal) 119 by the adder 17. Namely, according to a local decoding loop, the video is decoded (as the reference picture) and stored in the frame memory 18. In this case, in order to unify the format to be stored in the frame memory 18, a local format-transformation is carried out using the second local format-transformer 20 and the selector 21, if necessary. The quantized index 105, after quantizing, is scanned consecutively from a low frequency component to high frequency component to produce a one dimensional string of quantized DCT coefficients, and a variable length coding is performed at the variable length coder 6. Additionally, in each unit to select formats, the format selective information 127 is multiplexed as a part of the coded video bitstream.

In order to keep a volume of generated codes stable, by monitoring the output buffer 7, the signal showing the volume of generated codes 108 is recognized, and quantizing control is performed according to feedback by the rate controller 8.

DCT coding is used in the present embodiment, but other coding techniques, such as subband coding, are applicable to the invention. In the present embodiment, there is shown a configuration in which data locally format-transformed and untransformed data are switched by the detector 3. However, it is possible that the local format-transformer itself may perform this switching function.

Embodiment 3

Figure 9:
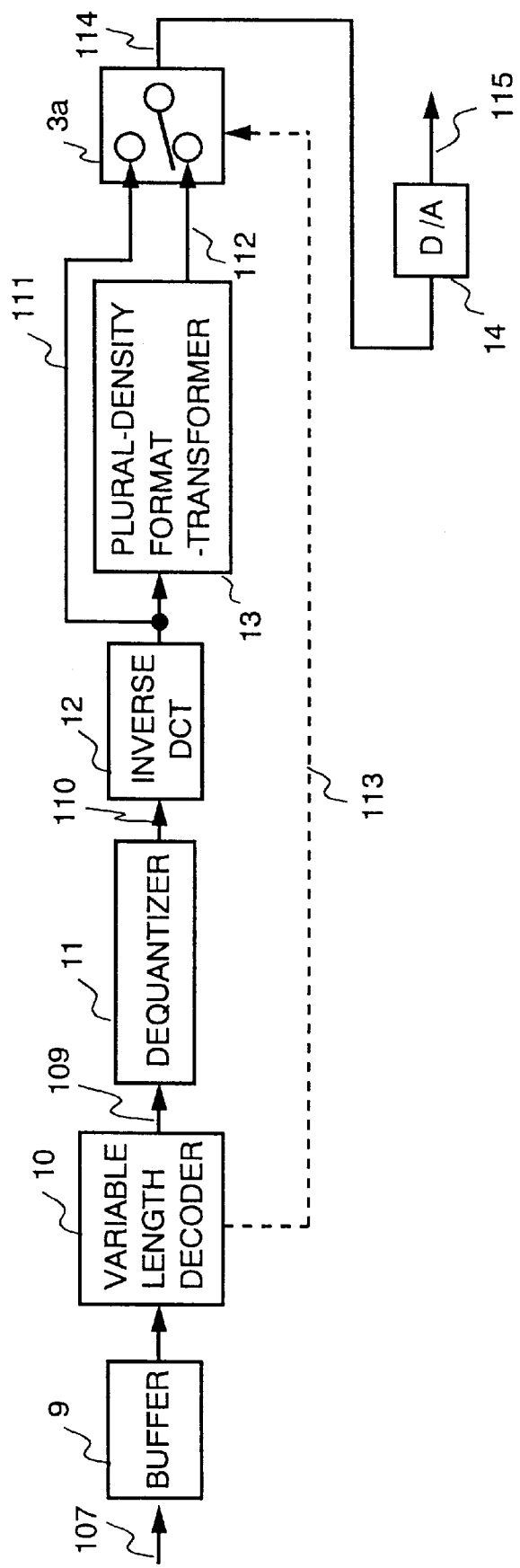
FIG. 9 shows a block diagram of a video encoder of Embodiment 3 of the present invention.

FIG. 9 shows a configuration of a basic video decoder when the predictive decoding loop is not provided. In the figure, as one new element, a local format-transformer (plural-density format-transformer) 13 is provided. The detector 3a in the decoder in the figure does not perform image detection. A selective information 113 detector is input to the detector 3a and the detector 3a performs selection of outputs. The other elements, including a buffer 9, a variable length decoder 10, a dequantizer 11, an inverse DCT 12, a D/A converter 14 are similar to the conventional elements discussed above.

A quantized index information after variable length decoding 109, a dequantized transform coefficient 110, a video data returned to a time domain of picture elements according to an inverse DCT transformation, a video data locally format-transformed 112, an information 113 to show which format is chosen, which corresponds to the format switching information 106 at the encoder side, a digitalized video data 114 whose format is unified, and a reconstructed output picture 115 are provided. The other elements are similar to those having like numbers, already described.

Next, the operation of FIG. 9 is described. The decoder in the present embodiment corresponds generally to a video coder of embodiment 1. A coded bit stream 107 is stored in the buffer 9. Data in the buffer 9 is read out and variable length decoding is performed at the variable length decoder 10. In this process, an information 109 of DCT coefficient, and information 113 to show which format is chosen in a block or a respective unit of plural blocks are decoded and sorted. Each 8 by 8 block of DCT coefficient data 109 is restored to DCT coefficient data 110 at a dequantizer 11 and converted to picture element data 111 at an inverse DCT 12.

Before outputting the data as a decoded picture, according to information 113, composing one bit to show whether data are at a plural-density format-transformer side or the original image signal format side, the selected format, in a detector 3a, a local format-transformer 13 to produce the corresponding format of the picture is dynamically switched and the decoded picture 114 is obtained. After that, according to D/A convert 14, a reconstructed video signal is obtained.

Embodiment 4

Figure 10:
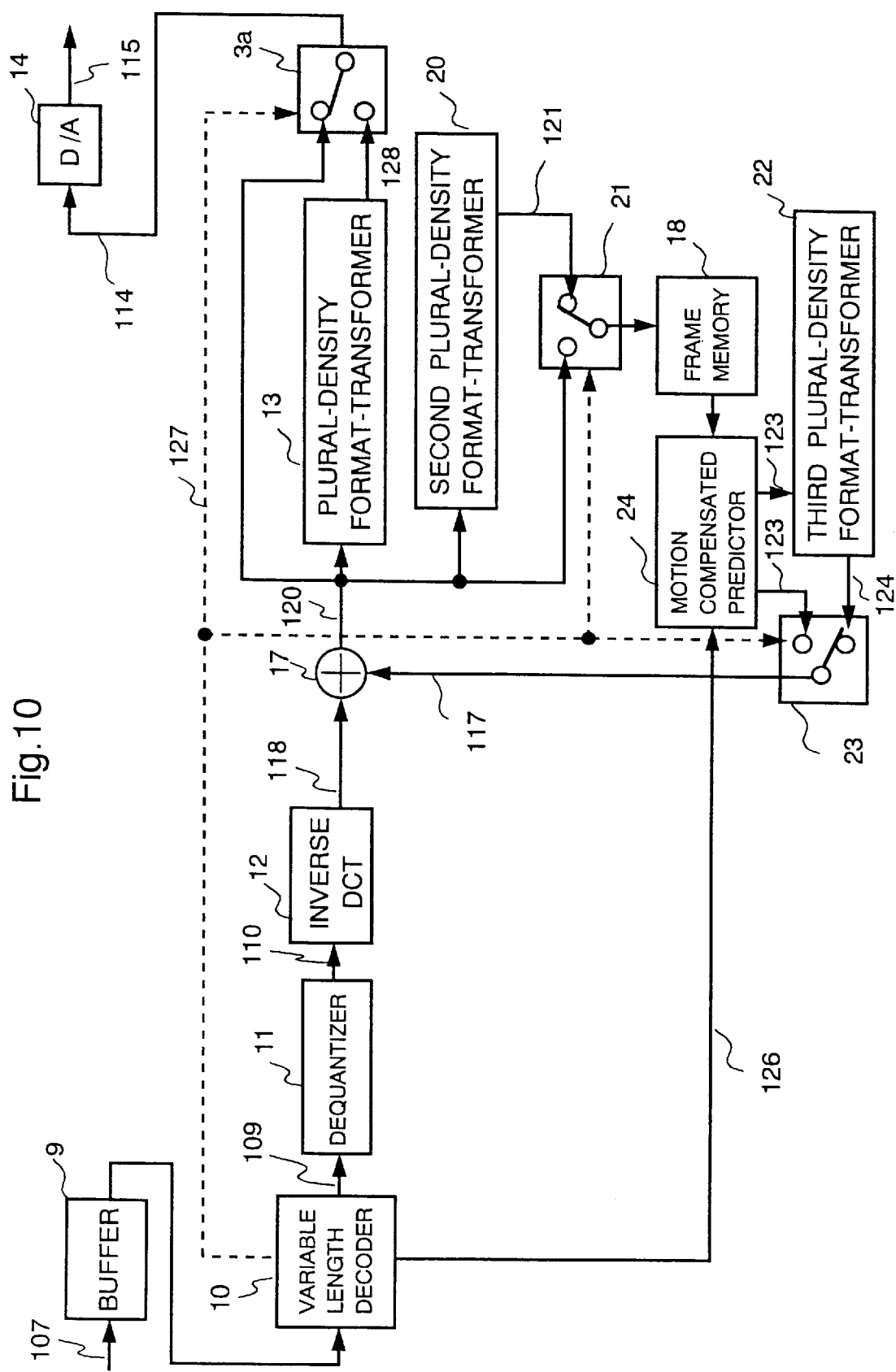
FIG. 10 shows a block diagram of a video decoder having a prediction decoder loop of Embodiment 4 of the present invention.

FIG. 10 shows a configuration of a video decoder having a prediction decoding loop which includes motion compensation. In the figure, as new elements, a second local format-transformer 20, a third local format-transformer 22, and selectors 21 and 23 are provided. A motion compensated predictor 24 and a decoded video data locally format-transformed signal 128 is also provided. The other elements are similar to those like-numbered features already described.

Next, the operation of FIG. 10 is described. A decoder in the present embodiment corresponds generally to the video coder of embodiment 2. A coded bit stream 107 is stored in the buffer 9. Data in the buffer 9 is read out, and variable length decoding is performed at the variable length decoder 10. In this process, DCT coefficient information 109, motion vector information 126, and the format selective information 127 used in a block or a respective unit of plural blocks are decoded and sorted. Each 8 by 8 block of DCT coefficient data 109 is restored to DCT coefficient 110 at the dequantizer 11, and converted to picture element data 118 at the inverse DCT 12.

In case of motion compensated prediction, video is decoded by adding the motion compensated prediction data 117, generated according to motion compensated prediction from a reference picture, to the picture element data 118 using the adder 17. The decoded picture 120 is stored in the frame memory 18 for the purpose of being used as the reference picture at the decoding process, if necessary.

In order to add a picture element data 118 and a motion compensated prediction data 117 generated according to motion prediction from the reference picture, the picture element data 118 and a format of the motion compensated prediction data 117 should be the same. Therefore, for the signal read out from the frame memory 18, local format-transformation is performed if necessary by means of the third local format-transformer 22 and the selector 23 so that the formats can be matched. Whether the local format-transformer is required or not (which format is selected by the detector) is indicated by the format selective information 127 sorted in advance.

Before outputting decoded video, the local format-transformer 13 is dynamically switched to unify the format of the picture at the detector 3a according to the format selective information 127 thereby showing the selected format, and the decoded picture 114 is thereby obtained.

In case of storing the decoded picture 114 in the frame memory 18, local format-transformation is performed if necessary by the second local format-transformer 20 and the selector 21 in order to match the formats.

Embodiment 5

Figure 11:
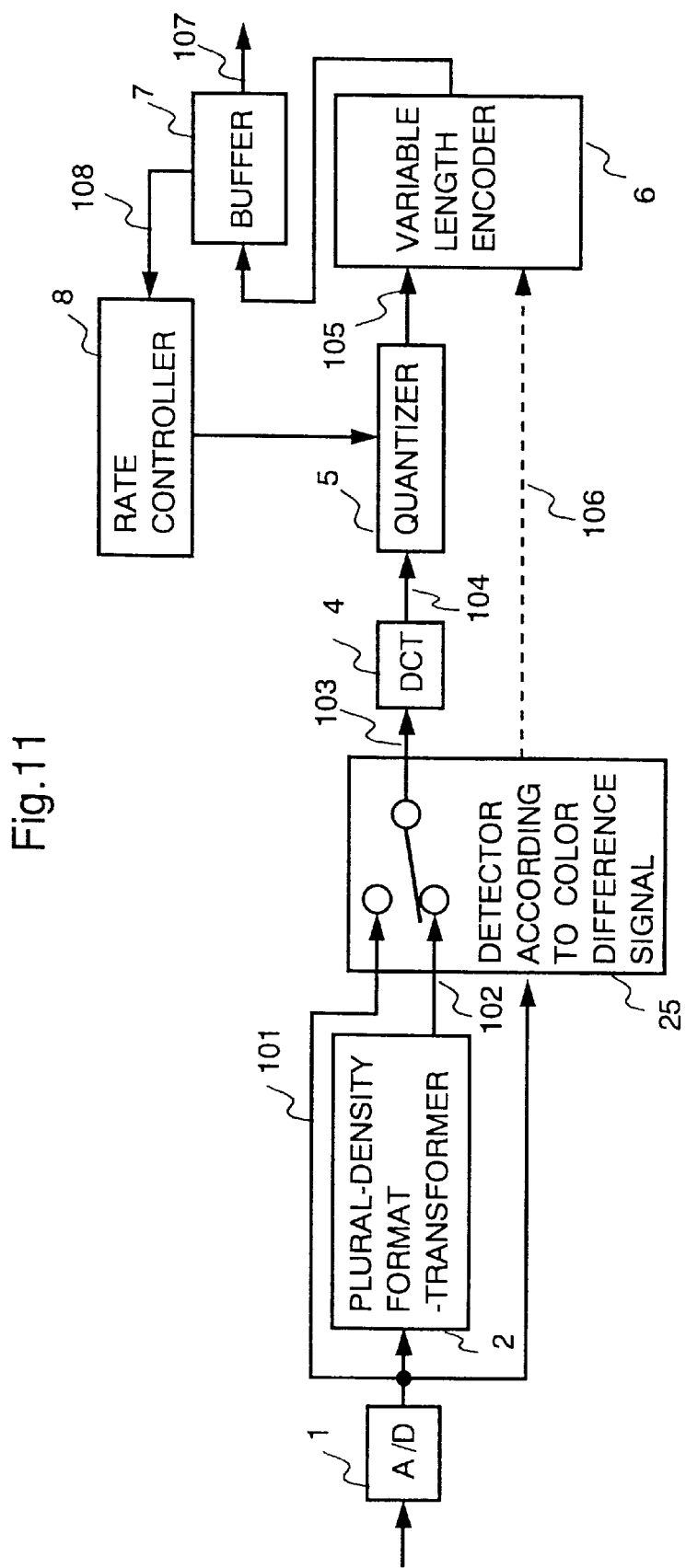
FIG. 11 shows a block diagram of a basic video encoder of Embodiment 5 of the present invention.

FIG. 11 shows a configuration of a basic coder including details of a detector 25. The detector indicates which format-transformer is selected in a local format (plural-density formats) transformer. In the figure, as one new element, a detector 25 for detecting a color difference component is provided and the input signal of the detector 3 of FIG. 1 is specified. The other elements are similar to those elements with like numbers already described.

Next, the operation of FIG. 11 is described.

In the present embodiment, a technique for determining whether local format-transformation is performed or not, and which format is selected, is explained. Here, a range for selecting a format is assumed to be a unit including a block or plural blocks. In the present embodiment, a format is selected based on the color difference signal of video data included in the same unit. For example, the color distortion is notably detected around a portion containing dark color, a portion where the value of color is drastically changed, namely, a portion in which color activity (e.g. variance) is high, and also around the color of human skin containing a face and lips. Based on this, at a point where the color distortion is conspicuous, it is possible to select a format whose sample density of the color difference signal is high.

Figure 12:
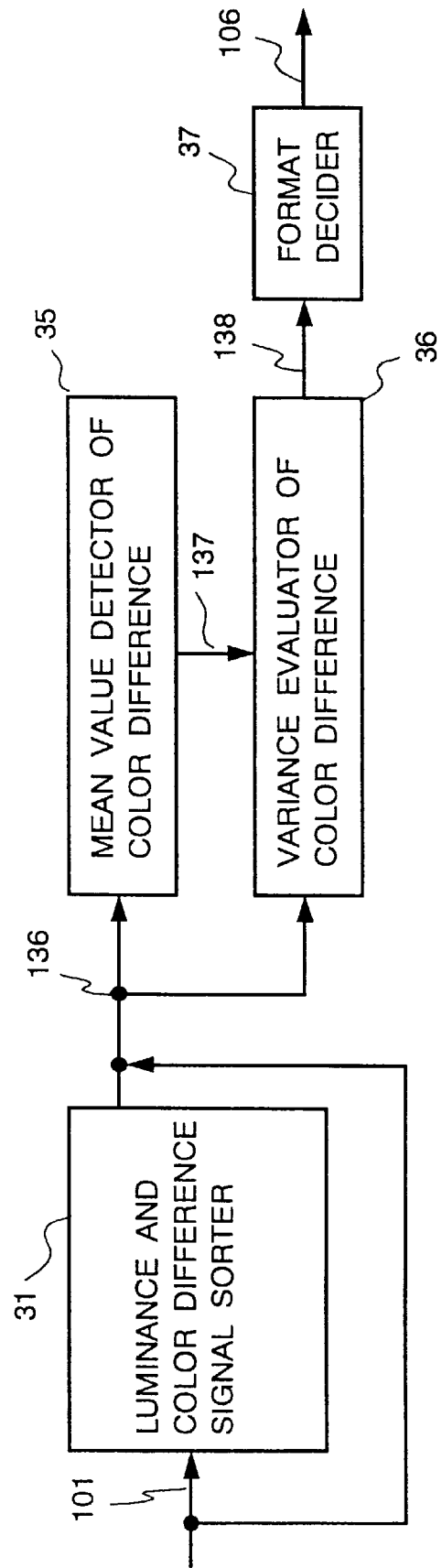
FIG. 12 shows an example of a detector according to a color difference signal of FIG. 11.

As a concrete example, FIG. 12 shows an exemplary detector 25. As shown in the figure, when in the input video data 101, luminance and color difference signals are multiplexed, the input video data 101 is sorted into each signal at the luminance and color difference signal sorter 31. Then, a color difference signal 136 is output. On the other hand, when the input video data 101 is already sorted into the color difference signal, the input video data directly forms the color difference signal 136 for input to a mean value detector of color difference 35 and a variance divergence evaluator of color difference 36. The mean value detector of color difference 35 evaluates a mean value 137 of the color difference in the picture domain by the unit of a block or plural blocks. By using the mean value 137 of color difference and the color difference signal 136, the variance evaluator of color difference module 36 evaluates the variance of color difference 138. A format decider 37 compares a color difference 138 with a predetermined threshold and judges if the format-transformer is required or not and which format is transformed. Then, the format switching information 106 is obtained. When the format-transformation is performed, the signal 103 selects the signal 102 as shown in FIG. 11.

Here, for example, when two threshold values (Th1, Th2) are. prepared and local format transformation is performed, the size of deviation Dev of the luminance component and the size of each threshold value (Th1, Th2) are compared. When the source input picture 101=4:4:4, or when the source input picture 101=4:2:0, the following cases can be prepared.

1) When the source input picture 101=4:4:4, 1-1) if (Dev<Th1) (when Th1<Th2)

In this case, change of the color is supposed to be plain. Therefore,

{down-sampling from 4:4:4 to 4:2:0}

1-2) else if (Dev>=Th1 & Dev2<Th2)

In this case, ratio of the change is not so high. Therefore,

{down-sampling from 4:4:4 to 4:2:2 }

1-3) else

{no change}

2) When the source input picture 101=4:2:0, 2-1) if (Dev>Th1) (when Th1>Th2)

{up-sampling from 4:2:0 to 4:4:4}

2-2) else if (Dev<=Th1 & Dev>Th2)

{up-sampling from 4:2:0 to 4:2:2}

2-3) else

{no change}

As is shown above, as a detection level, for example, variance of pixel value (the color difference in the above example) can be used. This is based on the fact that when the variance is large, the amplitude of the picture element is large and, on the other hand, when the variance is small, the value of the picture element is relatively unvarying and close to the mean value.

Figure 13:
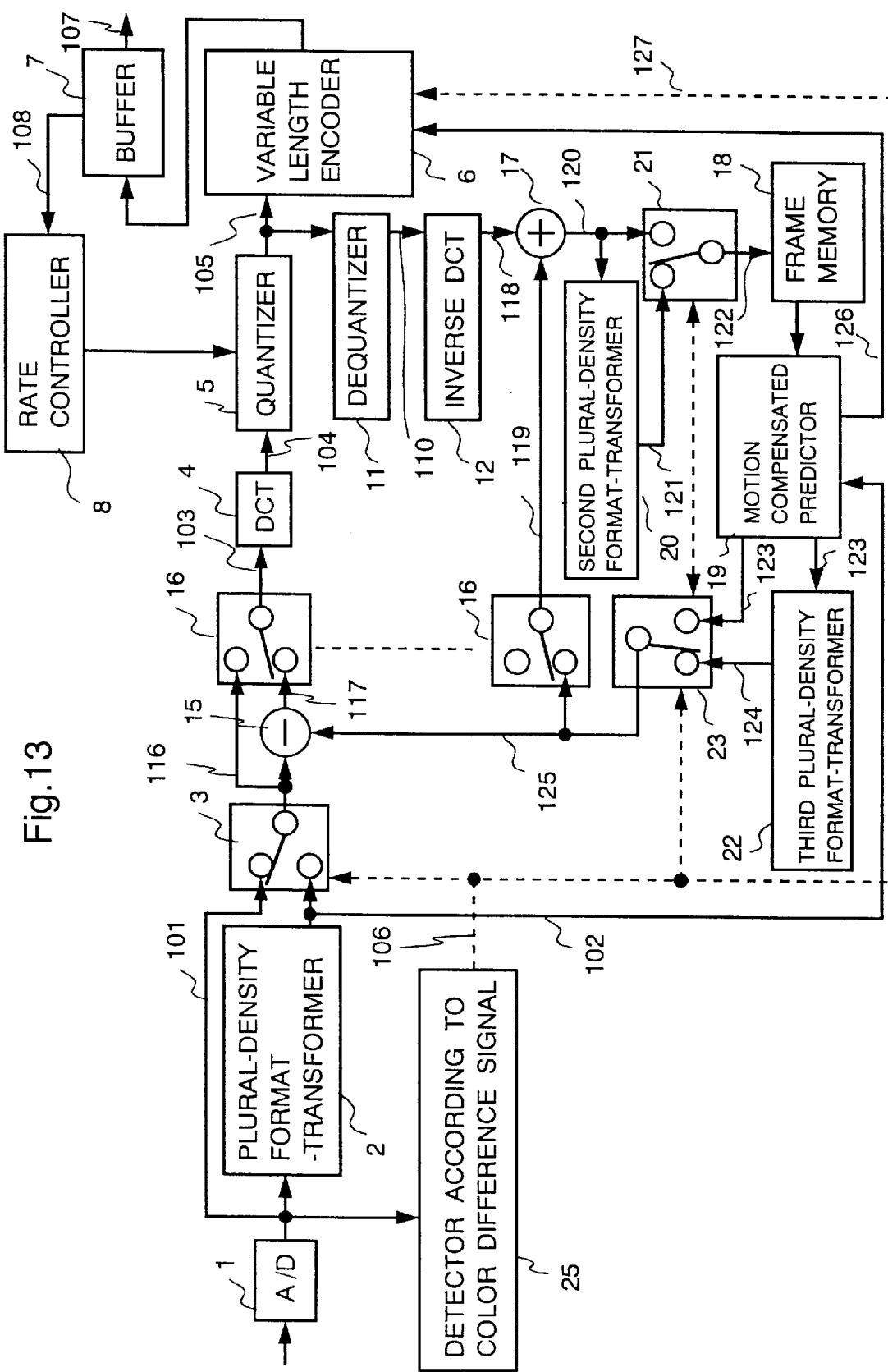
FIG. 13 shows a block diagram of a video coder having a prediction coder loop of Embodiment 5 of the present invention.

In Embodiment 1, a basic operation for selecting whether the local format-transformer for switching sample density rate of the luminance and color difference signals is used or not is explained. Therefore, it is possible to apply this example to the video coder of Embodiment 2, which is a modification in which a prediction coding loop is added. The configuration example of this case is shown in FIG. 13. In FIG. 13, the detector 3 and the detector 25 are shown separately. As shown in FIG. 11, numeral 3 shows the detector part included within the detector 25. When the present invention is adopted in the video coder of Embodiment 2, activity between frames of the color difference signals in the unit of performing selection of formats can be used as a standard.

In the present embodiment, the detector 25 uses the color difference signal of the input video data 101. However, like the other standard of inputs of the detector in the following embodiment, the color difference signal of the quantized index 105, which is an output of the quantizer 5, can be used.

Embodiment 6

Figure 14:
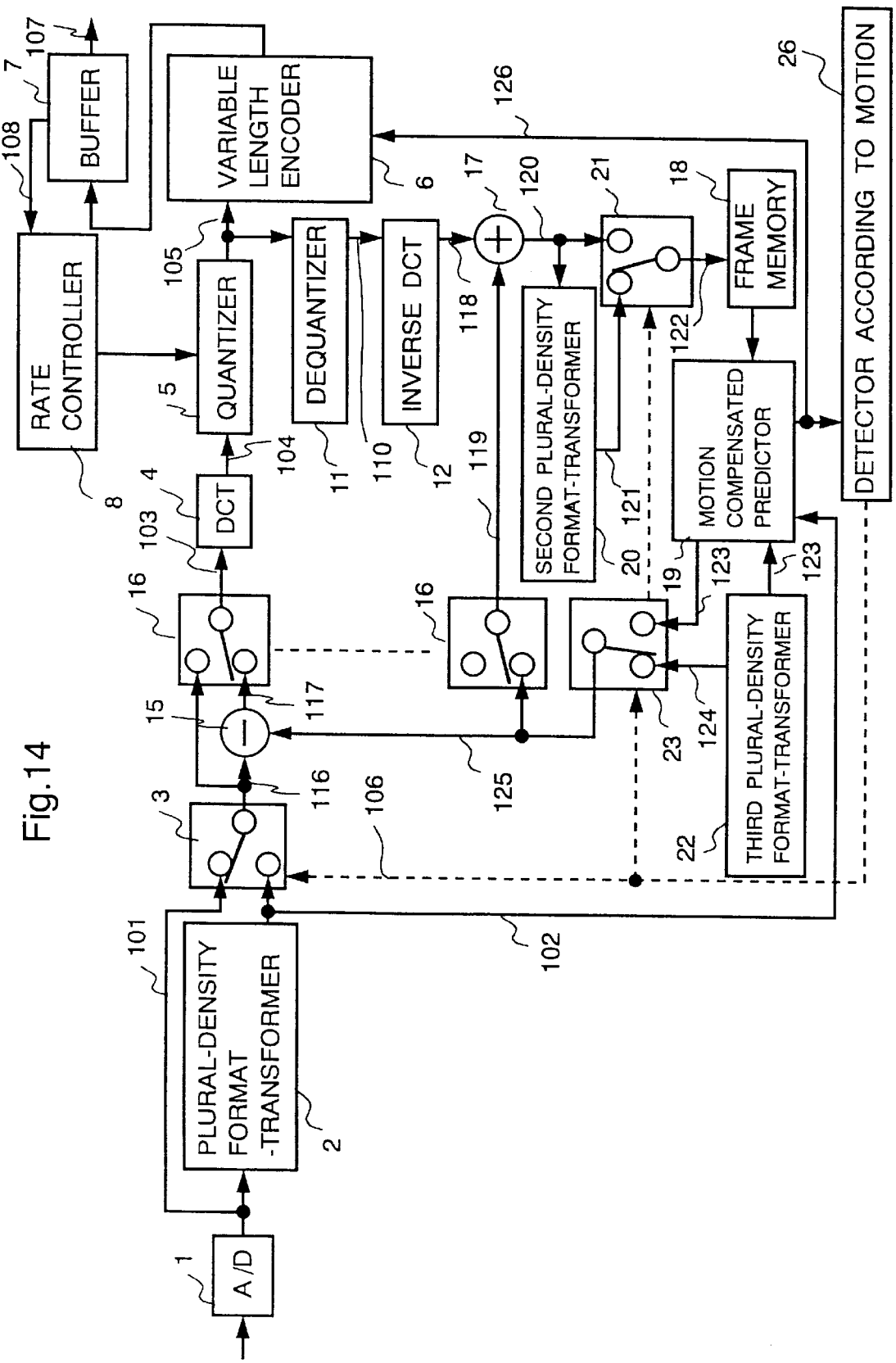
FIG. 14 shows a block diagram of a video coder having a prediction coder loop of Embodiment 6 of the present invention.

FIG. 14 shows a configuration of a coder with the prediction coder loop, wherein the coder has another type of a detector (which may select output of the local format-transformer). In the figure, as a new element, a detector 26 according to motion is provided and the input signal of the detector 3 of FIG. 1 is specified. The detector part and the selector part are separately shown in FIG. 13. The other elements are similar to those with like numbers already described.

Next, the operation of FIG. 14 is described.

In the present embodiment, another technique for determining whether local format-transformation is performed or not and which format is selected is explained. Here, a range for selecting an output of the local format-transformer is assumed to be a unit including a block or plural blocks. In the present embodiment, a format is selected based on the motion vector 126 by motion compensation included in the same unit. For example, the color distortion is notably detected around a portion where motion occurs between frames, and compression should be performed at a portion where a large volume of information occurs. Based on this, at a point where the color distortion is conspicuous, it is possible to select a format whose sample density of the color difference signal is high.

Additionally, since the motion vector is originally information to be provided as a part of the video bitstream to the decoder, there is an advantage that the format selection information need not be given to the decoder.

As described in Embodiment 5, whether format transformation is performed or not and which format is transformed is decided by comparing the size of the luminance component value and the size of the threshold value.

Figure 15:
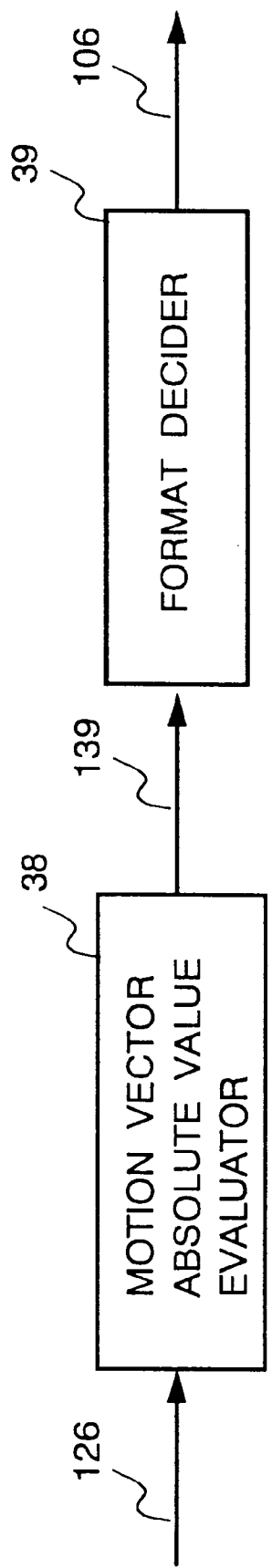
FIG. 15 shows an example of a detector for detecting motion in the system of FIG. 14.

FIG. 15 shows an example of the motion detector 26. In the figure, a motion vector absolute value evaluator 38 evaluates a sum of absolute values of level component and vertical component of the motion vector 126. A format decider 39 detects the degree of motion by comparing an absolute value 139 of the motion vector with a predetermined threshold value. Then, the format decider 39 decides if the format-transformer is used and outputs the format switching information 106.

According to the above description, the absolute value of motion is used. Instead of the absolute value, a sum of squares of level component and vertical component of the motion vector 126 can be used.

Embodiment 7

Figure 16:
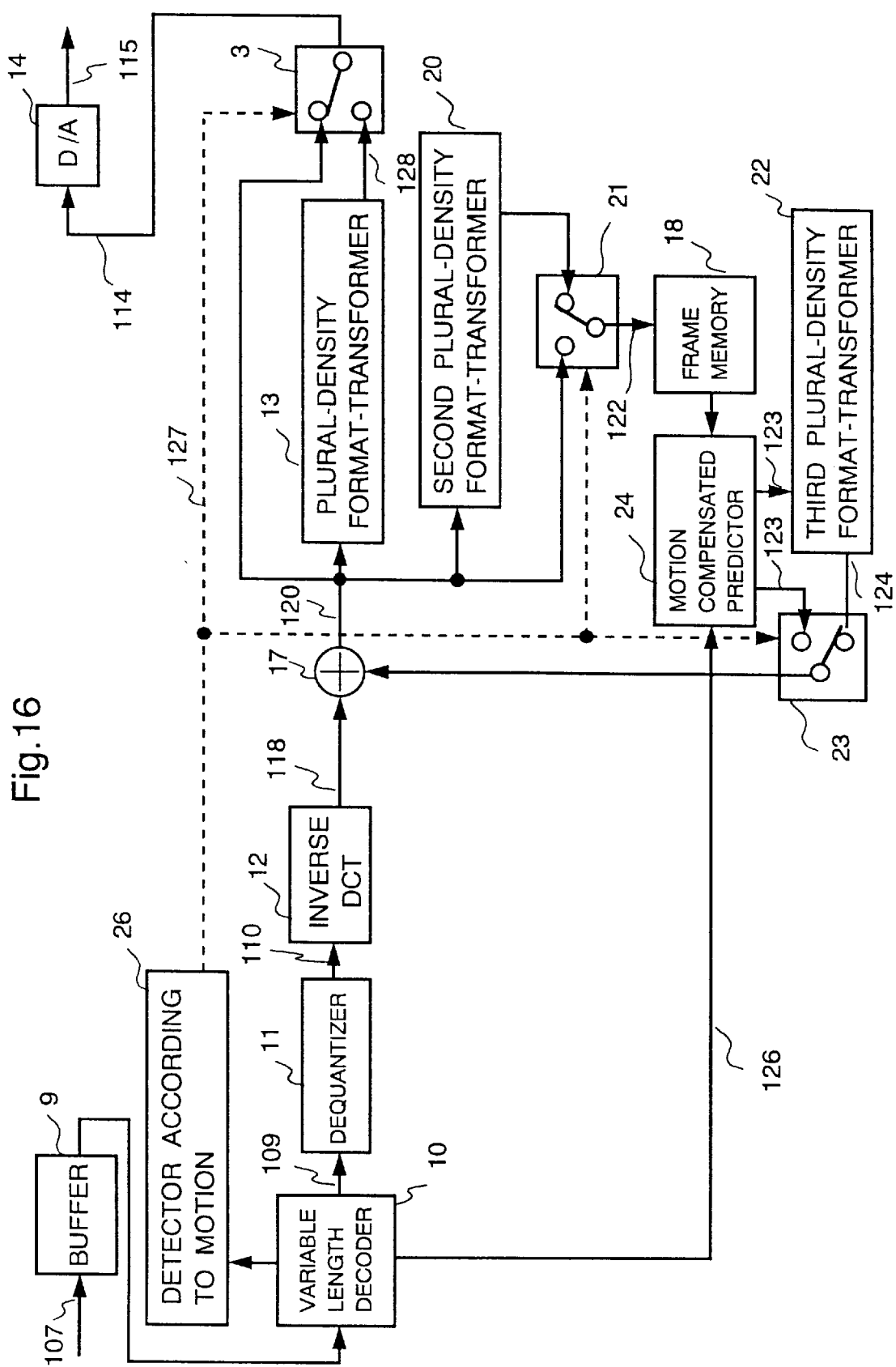
FIG. 16 shows a block diagram of a video decoder having a prediction decoder loop of Embodiment 7 of the present invention.

FIG. 16 shows a configuration of a video decoder with the prediction decoder loop in the receiver. This figure generally corresponds to the coder of Embodiment 6. Each element in the figure is similar to each of those elements already described.

Next, the operation of FIG. 16 is explained.

The coded input bitstream 107 is stored in the buffer 9. Data in the buffer 9 is read out and variable length decoding is performed at the variable length decoder 10. In this process, the DCT coefficient information 109, the motion vector and so on are decoded and sorted. Each 8 by 8 block of DCT coefficient data 109 is restored to the DCT coefficient 110 at the dequantizer 11 and transformed to the picture element data 118 at the inverse DCT module 12. In case of motion compensated prediction, a picture is obtained by adding the motion compensated prediction data 117 generated by the motion compensated prediction from the reference picture to the output of the DCT module 12. The decoded video 120 is stored in the frame memory to be used as a reference picture in the decoding process if necessary.

Format matching is needed in case of adding the picture element data 118 and the motion compensated prediction data 117 generated by the motion prediction from the reference picture. The third local format-transformer 22 and the selector 23 are used to process the motion compensated prediction data read from the frame memory 18. On selection of the local format-transformer by the detector, the format switching information 106 is used. The format switching information 106 is obtained at the detector 26 according to motion vector information 126 sorted in advance.

In fact, in case of motion compensation, the motion vector information is necessarily transmitted. Therefore, the format selective information 127 sent from the encoder side is not needed, and the number transmission bits can be reduced.

Before outputting a decoded picture signal, the local format-transformer 13 is dynamically switched to match the format of the picture at the detector 3 according to the format switching information 106 to show the selected format by the selector part of the format detector of motion, and the decoded picture 114 is obtained.

In case of storing the decoded picture 114 in the frame memory 18, local format-transformation is performed if necessary by the second local format-transformer 20 and the selector 21 in order to match the format.

Embodiment 8

Figure 17:
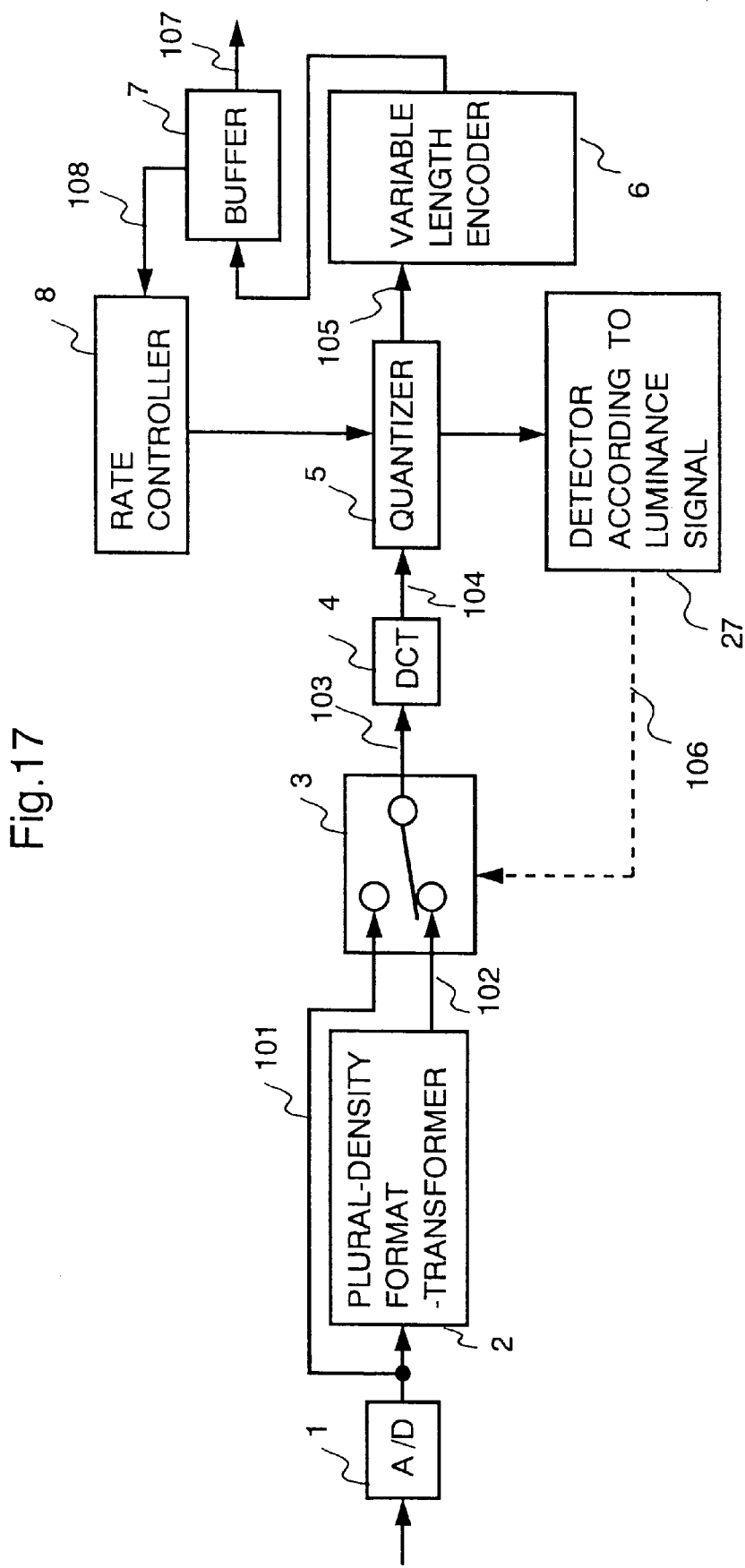
FIG. 17 shows a block diagram of a video encoder of Embodiment 8 of the present invention.

FIG. 17 is a configuration of a coder with the prediction coder loop, wherein the coder has another type of a detector (which may select the output of the local format-transformer). In the figure, luminance detector 27 is a new element. The input signal of the detector 3 of FIG. 1 is specified. As shown in FIG. 13, the detector and the selector are separately shown. The specific example is similar to the color difference signal of FIG. 12. The other elements are similar to those with like numbers, already described.

Next, the operation of FIG. 17 is described.

Selection is performed in the unit of a block or plural blocks. In the present embodiment, the luminance signal of the video data contained in the same unit selects whether the format-transformer is used or not, using the detector 27. For example, the color distortion often occurs in the portion of an image which has high luminance, namely a bright portion. On the dark portion, since the ability to sense the color degrades, the color distortion stands out less readily. Based on this fact, in the portion where the color distortion stands out easily according to a configuration circuit of FIG. 12, it is possible to select the format having the high sample density of the color difference signal. When the sample density of the luminance signal is stable and the sample density of the color difference signal is variable, the luminance signal is decodable on the decoding side without information of format selection. Therefore, format selection can be performed with the same algorithm based on the luminance signal on the decoding side. As a result, format selective information need not be given on the decoding side.

As described in Embodiment 5, whether format transformation is performed or not and which format is transformed is decided by comparing the size of the luminance component value and the size of the threshold value.

Figure 18:
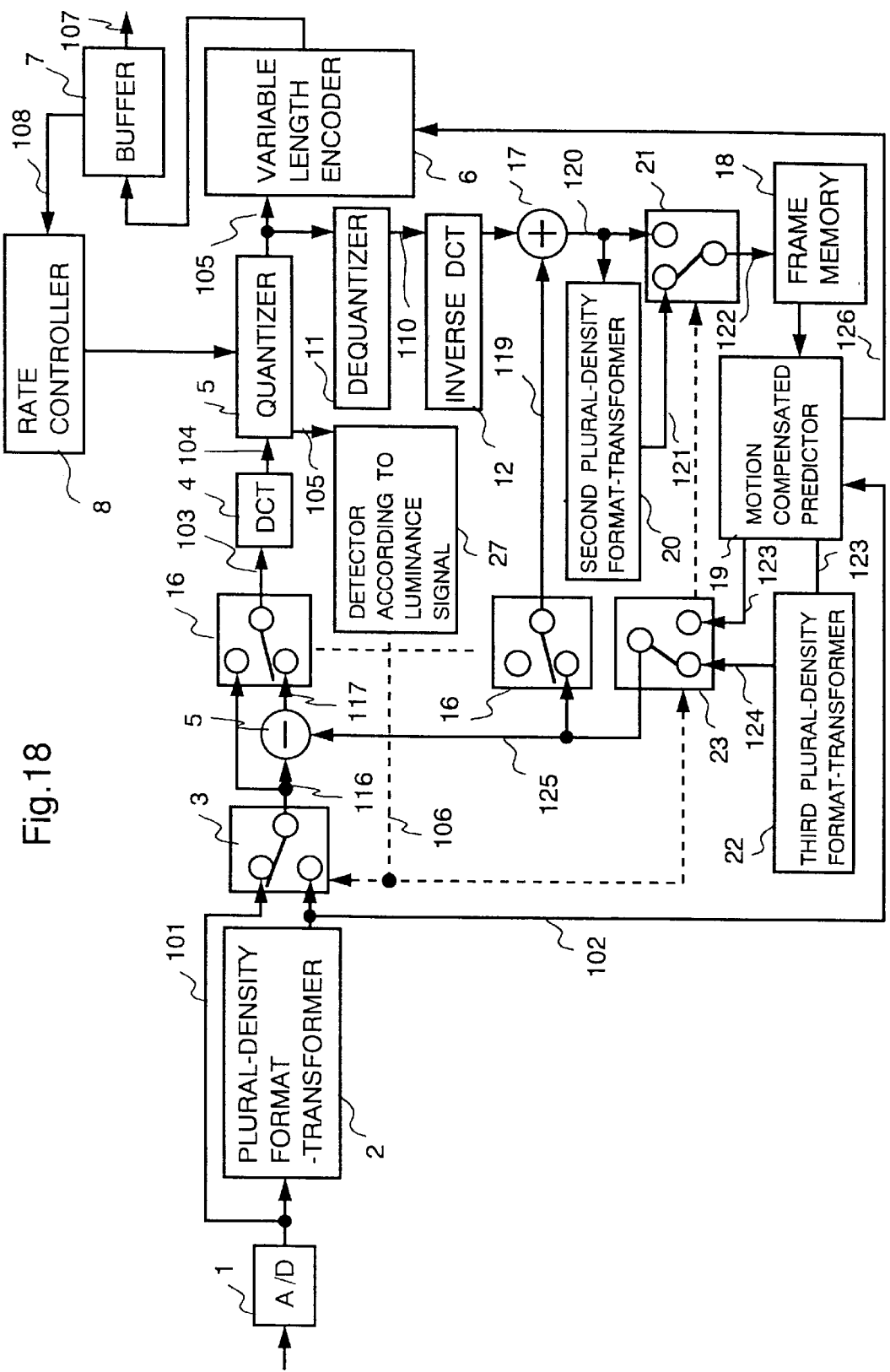
FIG. 18 shows a block diagram of a video encoder having a prediction coder loop of Embodiment 8 of the present invention.

In the present embodiment, the detector which selects a specific format of the video encoder of Embodiment 1 is explained. The present embodiment shows a configuration of a coder with the prediction coder loop, wherein the coder has another type of a detector (which may select output of the local format-transformer). Therefore, it is possible to apply the technique discussed here to the video coder of Embodiment 2, a coder with the prediction coder loop. The example of this case is shown in FIG. 18. An indication of sorting the detector and the selector is as shown in FIG. 17. In the case of FIG. 18 showing the prediction coder loop, activity between frames of the color difference signals in the unit of performing selection of formats can be used as a standard of selecting if the output of the plural-density format-transformer is selected.

The luminance detector 27 may have an evaluator to compare the quantized luminance value 105 with a standard. Then, the detector 27 selects outputs based on a result of comparison at the selector part 3 and outputs the format switching information 106 as a result of the comparison.

In the present embodiment, as input to the detector 27 according to the luminance signals, the luminance value 105, which is the quantized index of an output of the quantizer 5, is used. The luminance signal of the input video data 101 can likewise use color difference signals as in the previous embodiment.

Embodiment 9

Figure 19:
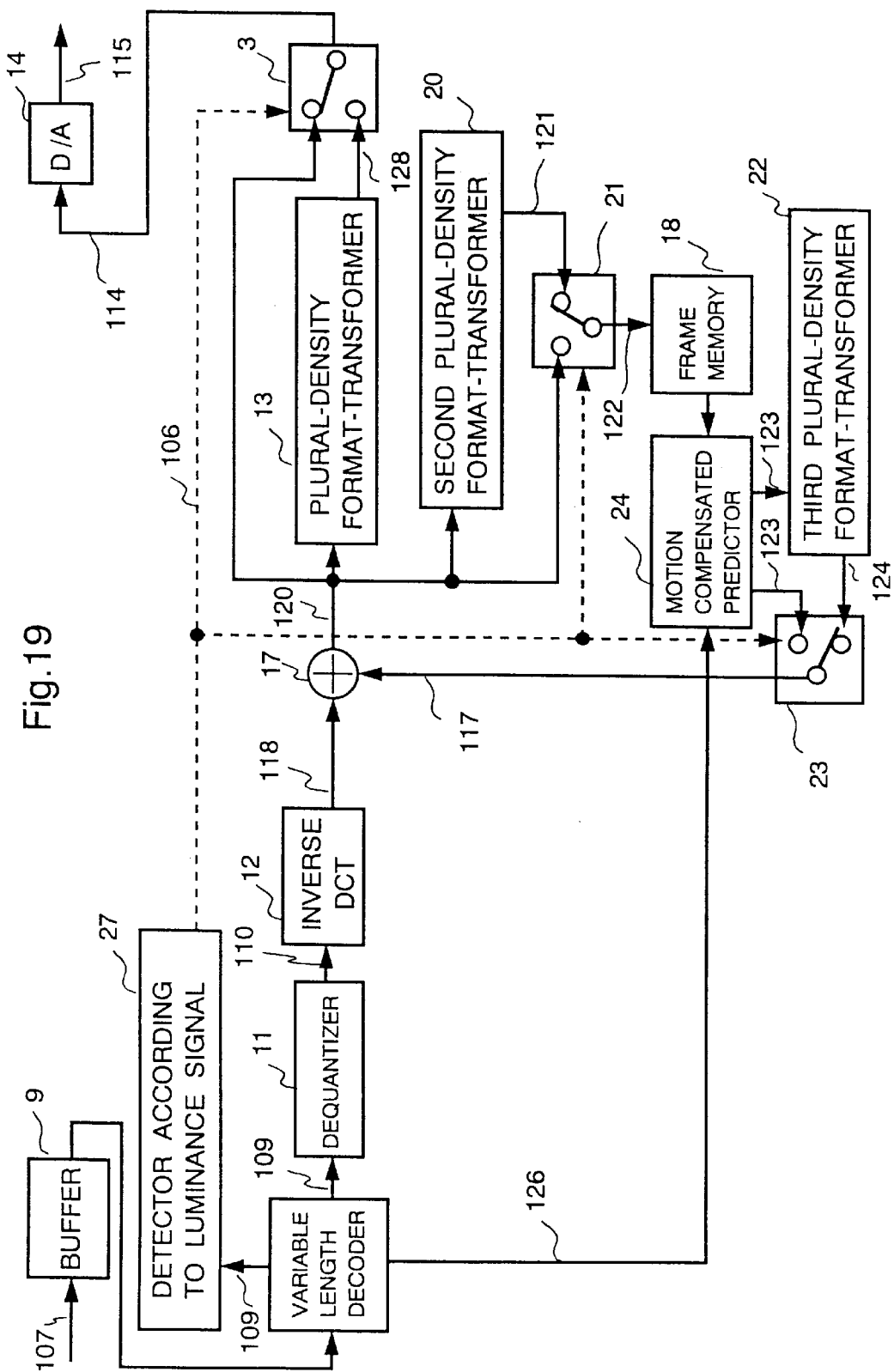
FIG. 19 shows a block diagram of a video decoder having a predictive decoding means of Embodiment 9 of the present invention.

FIG. 19 shows a configuration of a video decoder with the prediction coder loop, and generally corresponds to the video coder of Embodiment 8. Like-numbered elements in the figure are equivalent to those already explained.

Next, the operation of FIG. 19 is described.

The coded input bitstream 107 stored in the buffer 9 is read out and variable length decoding is performed. In this process, the DCT coefficient information 109, the motion vector 126 and so on are decoded and sorted. Each 8 by 8 block of DCT coefficient data 109 is restored to the DCT coefficient 110 and transformed to a picture element data 118 using the inverse DCT. In case of motion compensated prediction, the picture is decoded by adding the motion compensated prediction data 117 to the output of the inverse DCT, and the decoded picture 120 is stored in the frame memory 18, if necessary.

Format matching is performed in the case of adding the picture element data 118 and the motion compensated prediction data 117 generated by the motion prediction from the reference picture. The third local format-transformer 22 and the selector 23 are used for the motion compensated prediction data read from the frame memory 18. On selection of the local format-transform, the quantized value 109 of the luminance signal is used. For example, the color distortion can be notably detected in a portion where luminance is high, namely in a bright portion. Since the ability to sense the color degrades in the dark portion, the color distortion does not readily stand out. When the format is selected according to the same algorithm as that of the coding side, format selective information is not needed.

Before outputting decoded video, the local format-transformer 13 is dynamically switched by the selector part 3 of the detector 27 to match the format of the picture at the selector part 3 of the detector 27 according to the format switching information 106 which shows the selected format. Then, the decoded picture 114 is obtained.

In case of storing the reference picture in the frame memory 18, local format-transformation is performed, if necessary, by the second local format-transformer 20 and the selector 21, in order to match the format.

Embodiment 10

Figure 20:
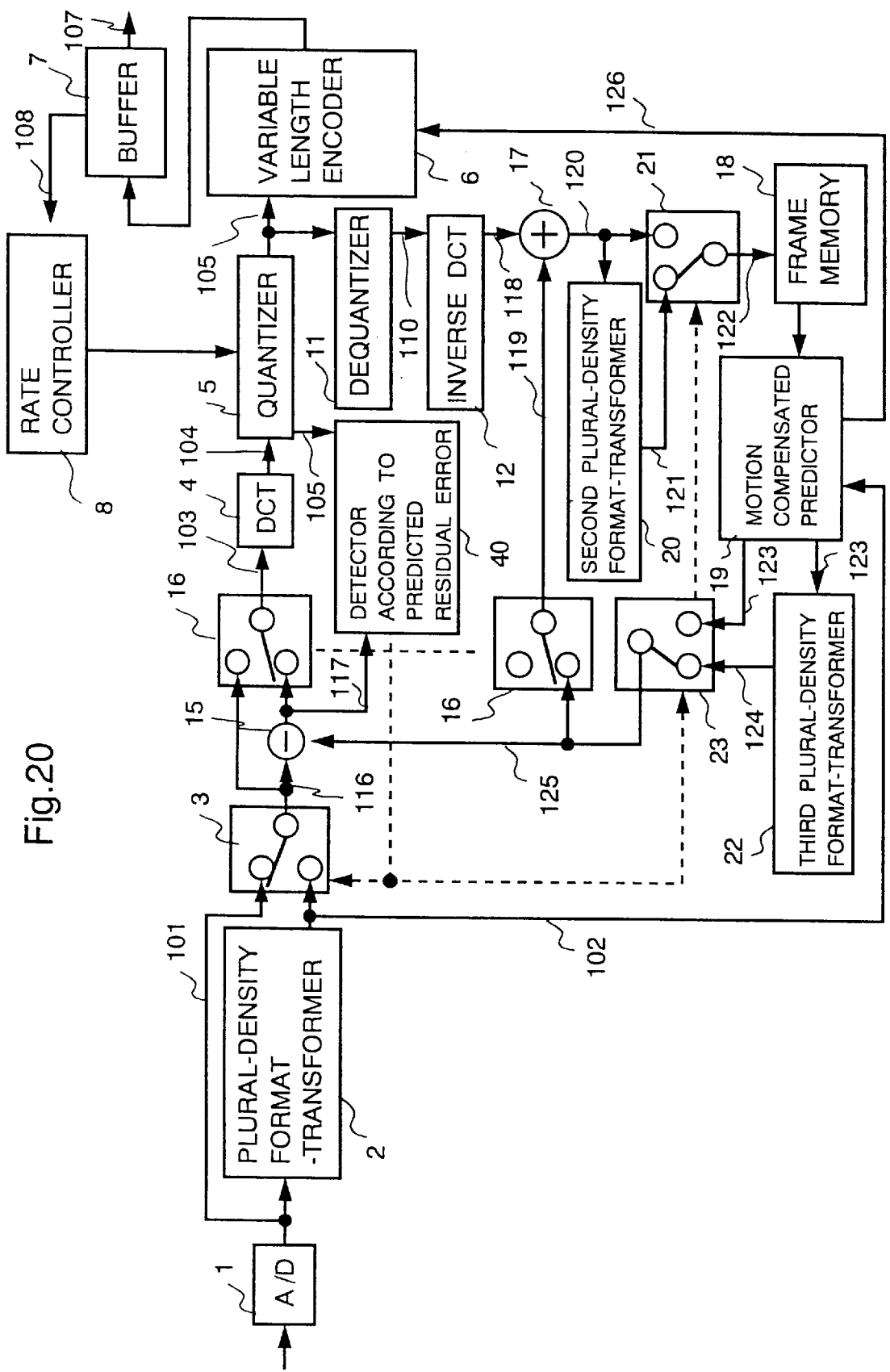
FIG. 20 shows a block diagram of a video encoder having a prediction coder loop of Embodiment 9 of the present invention.

FIG. 20 shows a configuration of a coder with the prediction coder loop, and wherein the coder has another type of a detector (which may select output of the local format-transformer). In the figure, one new element is a detector 40 according to predicted residual error. The detector 40 specifies the input signal of the detector 3 of FIG. 1. As shown in FIG. 13, the detector part and the selector part are separately shown. The other elements are similar to those with the same numbers already described.

Next, the operation of FIG. 20 is described. The operation, except for detecting how the output of the plural-density format-transformer is selected, is not explained here to avoid needless repetition. In the configuration of the present embodiment, the format switching information 106 need not be sent to the decoding side.

In FIG. 20, an output of the local format-transformer is selected based on the predicted residual error data 117 after motion compensated prediction in the unit of selection of format-transformation. For instance, notably, the color distortion is frequently detected in a case where a volume of the predicted residual error is large. If predicted residual error value is larger than a predetermined threshold value in a configuration of FIG. 20, it is detected that an energy of the predicted residual error is large. Accordingly, it is effective to increase the number of samples of the color difference signal only in this case, and decrease it in the other cases. In the above explanation, the detector 40 has a configuration to detect the volume of the predicted residual error by inputting the predicted residual error data 117. It is possible to adopt a configuration to detect the volume of the predicted residual error by inputting a quantized index 105 as an output of the quantizer 5.

As described in Embodiment 5, whether format transformation is performed or not and which format is transformed is decided by comparing the size of the predicted residual error and the size of the threshold value.

Embodiment 11

Figure 21:
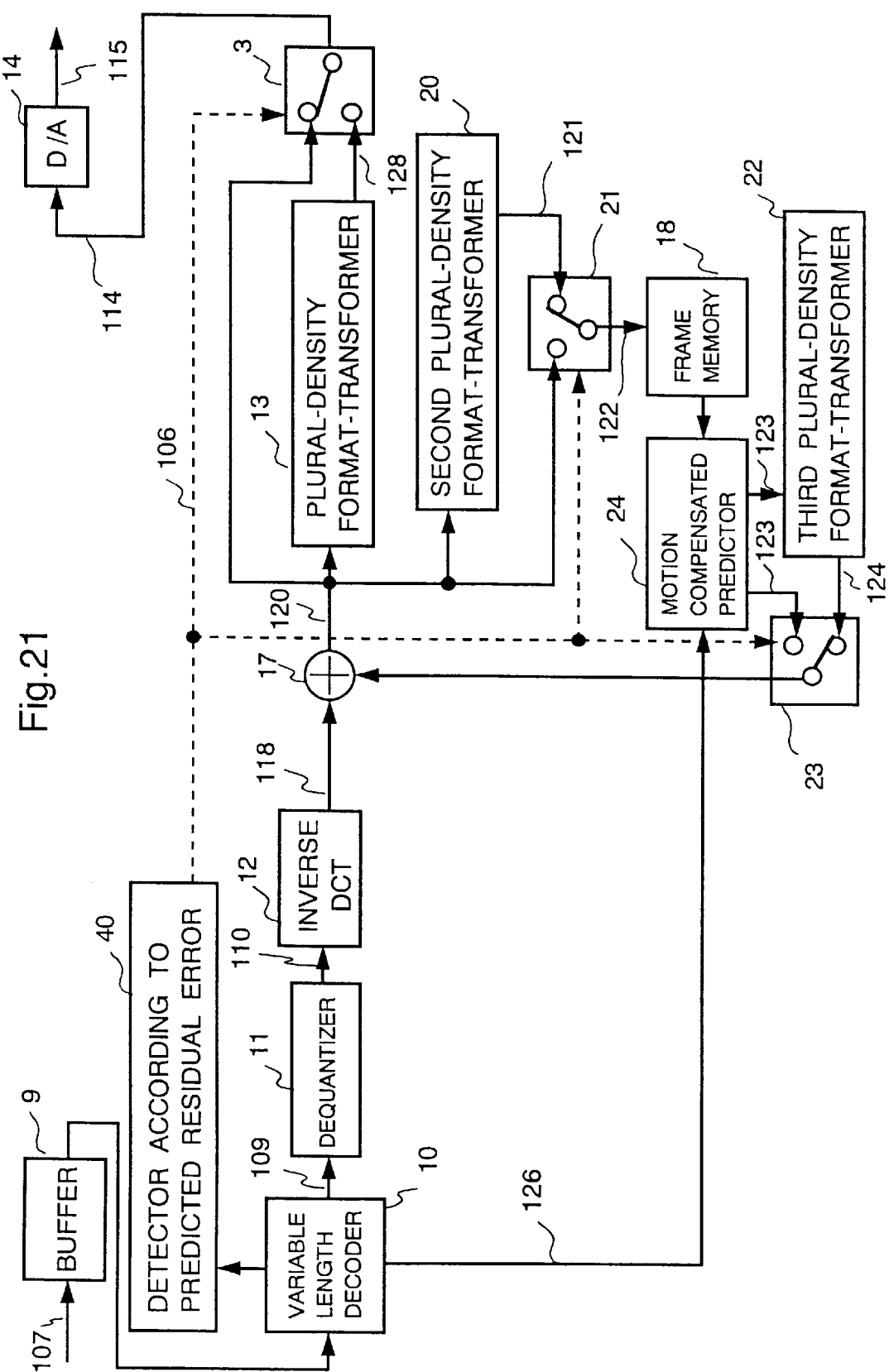
FIG. 21 shows a block diagram of a video decoder having a prediction decoder loop of Embodiment 11 of the present invention.

FIG. 21 shows a configuration of a video decoder of the receiver generally corresponding to the coder of Embodiment 10. Features having numbers already identified are equivalent to those already explained.

The operation, except for detecting how the output of the plural-density format-transformer is selected, is not explained here to avoid needless repetition. The coded input bit stream 107 stored in the buffer 9 is read out, and variable length decoding is performed. In this process, the DCT coefficient information 109, the motion vector 126, and so on, are decoded and sorted.

Format matching is performed in the case of adding the picture element data 118 and the motion compensated prediction data 117 generated by the motion prediction from the reference picture. The third local format-transformer 22 and the selector 23 are used for the motion compensated prediction data read from the frame memory 18. Output information from the detector 40 according to the predicted residual error in case of input of the motion vector 126 sorted in advance selects the local format-transformer according to the detector.

Embodiment 12

Figure 22:
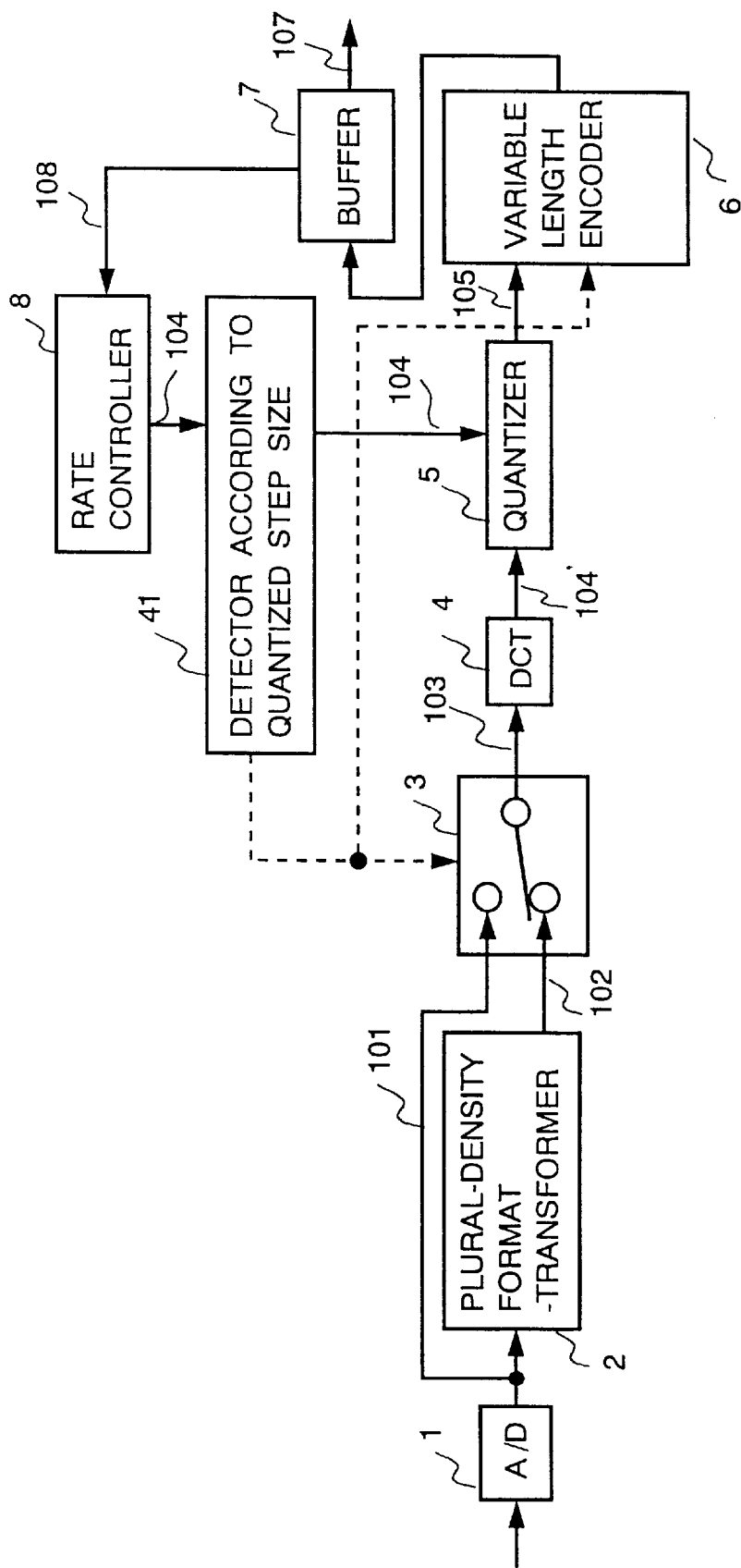
FIG. 22 shows a block diagram of a video encoder of Embodiment 12 of the present invention.

FIG. 22 shows a configuration of a basic video coder using another type of detector. The detector indicates which format-transformer in a local format-transformer is selected. In the figure, a new element is a format detector 41 according to quantizing step size. The detector 41 specifies an input signal of the detector 3 of FIG. 1. As shown in FIG. 13, the detector part and the selector part are separately shown. The other elements are equivalent to those with like numbers already described.

Next, the operation of FIG. 22 is described.

According to the configuration of the present embodiment, format selective information need not be given to the decoder. The description of the operation except for the detection and selection by the detector 41, is omitted. In the present embodiment, a format is selected based on a quantized step size 140 which shows the volume of the quantized coding coefficient or quantizes the coding video signal. When the quantized step size 140, an output of the rate controller 8, is large, degradation of the video is notable. Based on this fact, it is effective to select the format whose sample density of the color difference signal is high, and to select the sample density of the color difference component when the quantized step size 140 is small. Namely, in the configuration of FIG. 22, the detector 41 according to a quantized-step size compares the quantized step size 140 with the setting threshold value and selects the selector part 3.

As described in Embodiment 5, whether format transformation is performed or not and which format is transformed is decided by comparing the size of the quantized step size and the size of the threshold value.

Since the quantized step size 140 is decodable in the decoder without information concerning the format selection, it is possible to perform format selection with the same algorithm as that of the coder, based on the luminance signal. Therefore, format selective information need not be given to the decoder.

Figure 23:
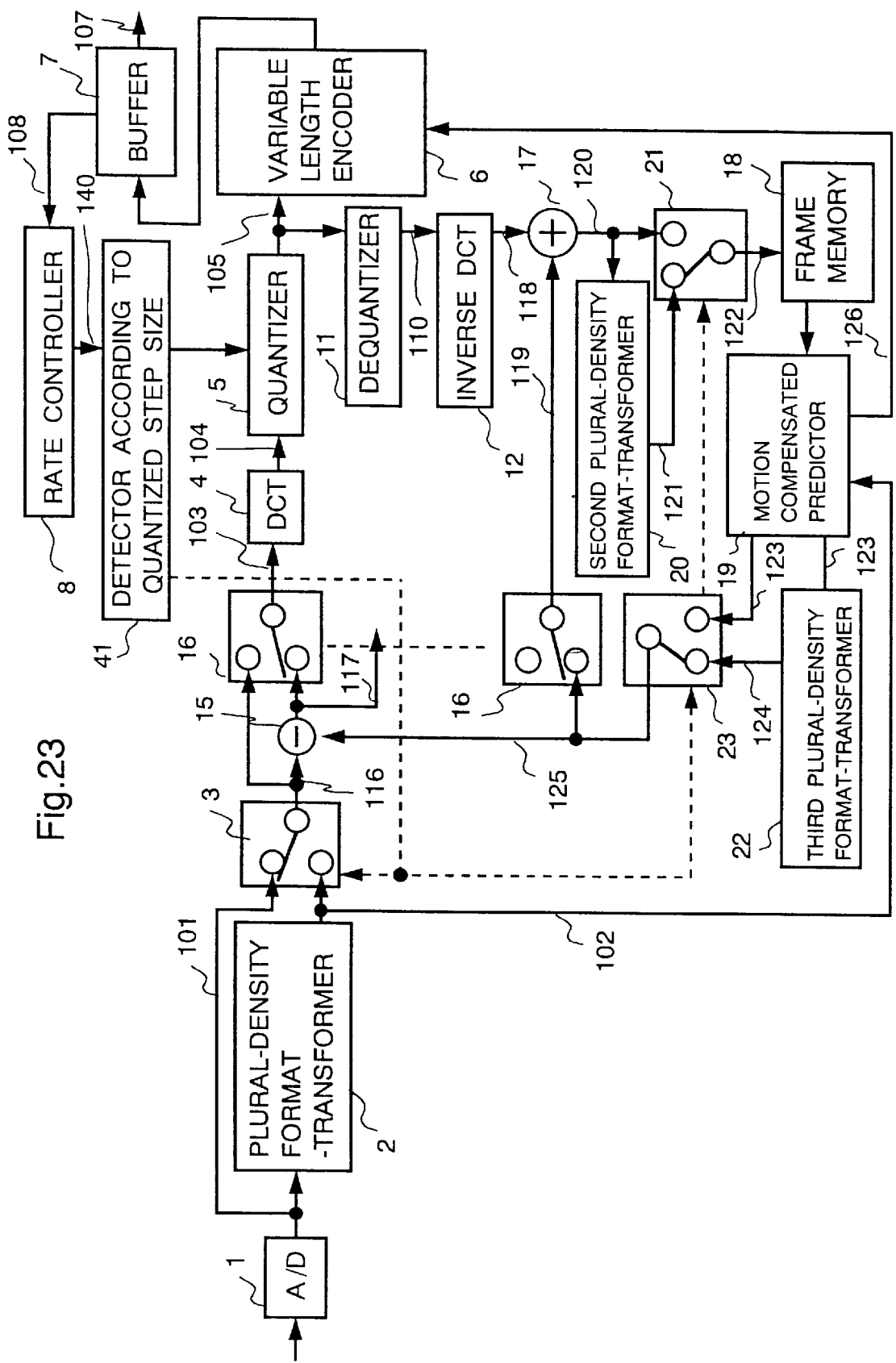
FIG. 23 shows a block diagram of a video encoder having a prediction coder loop of Embodiment 12 of the present invention.

In the present embodiment, as shown as the basic video coder without the prediction coder loop, the detector according to a quantized step size is for selecting the sample density rate of the luminance signal and the color difference signals. Therefore, it is adaptable to the video coder with prediction coder loop. An example of this configuration is shown in FIG. 23.

Embodiment 13

Figure 24:
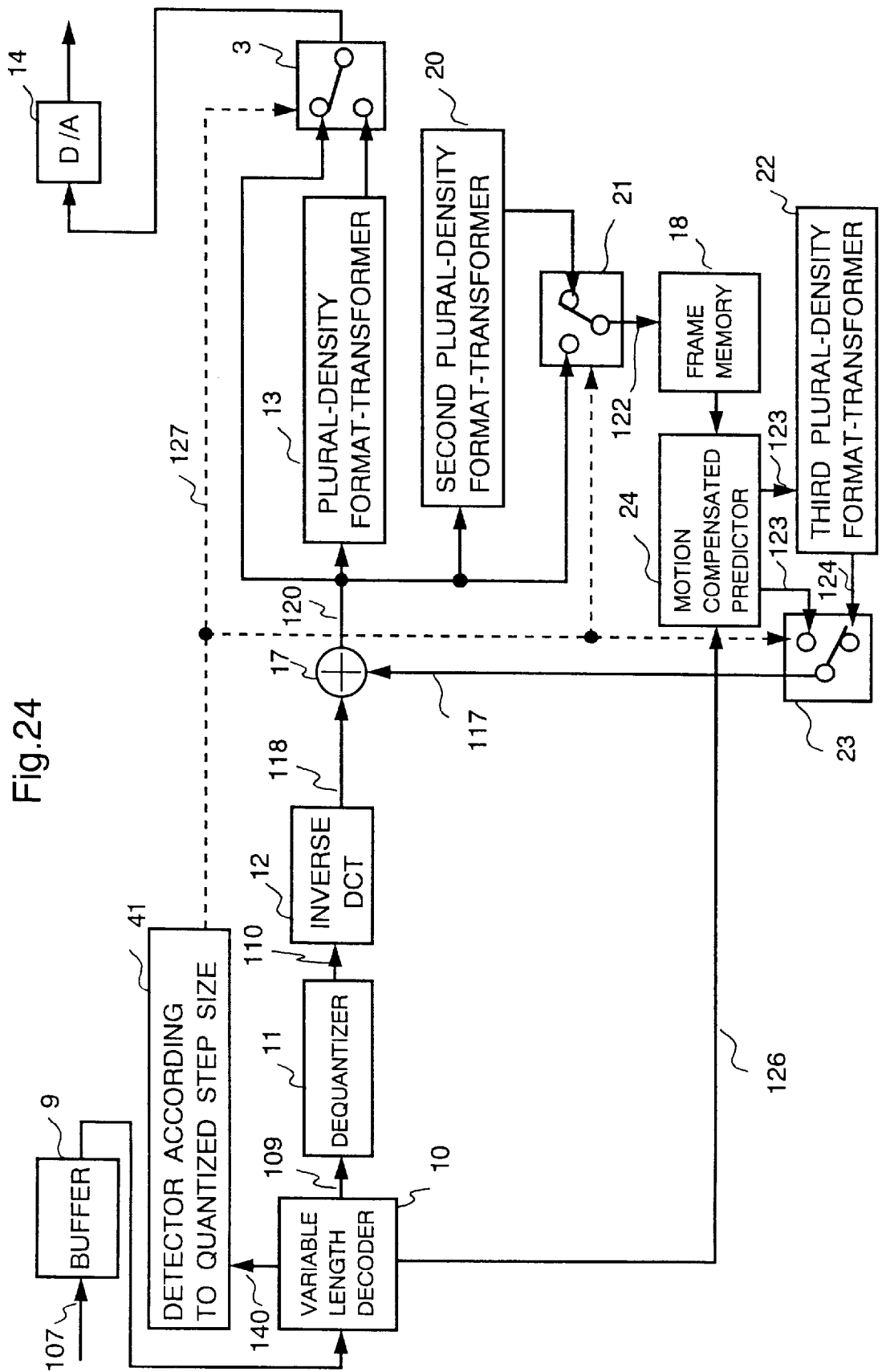
FIG. 24 shows a block diagram of a video decoder having a prediction decoder loop of Embodiment 13 of the present invention.

FIG. 24 shows a configuration of a video decoder with the prediction decoder loop of the receiver, and generally corresponds to the video coder of Embodiment 12. Those features already explained are assigned previously identified reference numbers.

Next, the operation of FIG. 24 is described.

Format matching is performed in the case of adding the picture element data 118 and the motion compensated prediction data 117 generated by the motion prediction from the reference picture. The third local format-transformer 22 and the selector 23 are used for the motion compensated prediction data read from the frame memory 18. On selection of the local format-transformer according to the detector, a quantized value step size 140 of the sorted signal obtained in the process of variable length decoding is used.

Before outputting decoded video, the local format-transformer 13 is dynamically selected to match the format of the picture at the detector 3 according to the format switching information 106, and the decoded picture 114 is obtained.

In case of storing the decoded picture 114 in the frame memory 18, local format-transformation is performed by the second local format-transformer 20 and the detector 21.

In each embodiment, only a single signal is input to the various detectors for detecting and selecting output of the plural-density format-transformer. However, as an input of detection, it is possible to input plural signals instead of the single signal. Namely, it is possible to use an increased added signal and it is possible to give an ultimate selective output information 106 as a logical operation result, which is a result of selection of each signal.

Furthermore, it is possible to configure the video coding and decoding system with combining the video coder and the video decoder in the above described embodiments.

It will be understood that the foregoing is merely illustrative of the principles of the invention, and that various modifications can be made by those skilled in the art without departing from the scope and spirit of the invention, as reflected by the following claims.

What is claimed is:

1. A video encoder, having a quantizer for quantizing format-transformed source input-pictures into quantized data, and having a coder for coding the quantized data into a coded bitstream, and for outputting the coded bitstream, comprising:

a first plural-density format-transformer for transforming from among a plurality of density formats a source input-picture into a specific format-transformed source input-picture, and for inputting the specific format-transformed input-picture into the quantizer;

a detector for detecting a variation in at least one of a luminance and color difference related component, and for selecting said specific format-transformed source input-picture for input to the quantizer depending on the variation; and a coder loop having:
      a frame memory for storing a reference picture;
      a second plural-density format-transformer for transforming the quantized data into a specific reference picture to serve as the reference picture stored in said frame memory; and
      a third plural-density format-transformer for transforming the specific reference picture, after a motion compensating prediction operation is performed into a motion compensated reference picture for feedback to an output of said detector;

wherein the detector selects corresponding outputs of the second plural-density format-transformer and the third plural-density format-transformer.

2. A video encoder according to claim 1, wherein the detector compares one of a color difference component in the input picture and a color difference component in the quantized picture, with a corresponding setting threshold level, and on the basis of said comparison, selects outputs of all present plural-density format-transformers, i.e. the first plural-density format-transformer or the first, second and third plural-density format-transformers, respectively.

3. A video encoder according to claim 1, wherein the detector compares one of a luminance component in the input picture, a luminance in the quantized picture and a quantized step size measured in the coded bitstream, with a corresponding setting threshold level, and on the basis of said comparison, selects outputs of all present plural-density format-transformers, i.e. the first plural-density format-transformer or the first, second and third plural-density format-transformers, respectively.

4. A video encoder according to claim 1, wherein the detector compares one of a value of a motion vector and a predicted error difference, and on the basis of said comparison, selects outputs of all present plural-density format-transformers.

5. A video decoder, having a decoder for decoding an input coded bitstream into quantized coefficient data, and having a dequantizer for dequantizing the quantized coefficient data into decoded macroblock data, and for generating reconstructed output pictures from the decoded macroblock data, comprising:

a first plural-density format-transformer for transforming from among a plurality of density formats the decoded macroblock data into specific decoded macroblock data; and a predictor loop having:
      a frame memory for storing a reference picture;
      a second plural-density format-transformer for transforming the decoded macroblock data into a specific decoded macroblock to serve as the specific reference picture; and
      a third plural-density format-transformer for transforming the specific reference picture for adding to the decoded macroblock data.

6. A video decoder according to claim 5, wherein the first plural-density format-transformer transforms the decoded macroblock data into specific decoded macroblock data according to a variation in at least one of a luminance and color difference related component of said input coded bitstream.

7. A video decoder according to claim 6, further having a detector for detecting a variation in one of a color difference component, a luminance component, a quantized step size, a value of a motion vector corresponding to a video encoder and a predicted error in the bitstream input, with reference to a setting level, and for obtaining the decoded picture by a selecting output of the first plural-density format-transformer or the first, second and third plural-density format-transformers, respectively.

8. A video encoding system, comprising a video encoder according to claim 1.

9. A method for encoding source input-pictures into a coded bitstream for output, comprising the steps of:

transforming from among a plurality of density formats said source input-picture into format-transformed source input pictures using a first plural-density format-transformer;

detecting a characteristic of one of a luminance and color difference related component, and in response to said detecting, selecting specific format-transformed source input-pictures from said plural-density format-transformer for input to a quantizer;

quantizing, at said quantizer, said specific format-transformed source input to a quantized data; and coding the quantized data into a coded bitstream for output; and a coder loop, including the steps of:
      transforming, using a second plural-density format-transformer, the quantized data into a specific reference picture;
      storing said specific reference picture in a frame memory;
      performing a motion compensated prediction on the basis of said specific reference picture stored in said frame memory to generate a motion compensated reference picture;
      transforming the said motion compensated reference picture using a third plural-density format-transformer to generate a feedback output; and
      applying said feedback output to an output of said detector.

10. A method for encoding according to claim 9, wherein said step of detecting further comprises:
comparing one of a color difference component in the input-picture, a luminance component in the input picture, a color difference component in the quantized picture, a luminance component in the quantized picture, a value of a motion vector, a predicted error difference, and a quantized stepsize measured in the coded bitstream, with a corresponding setting threshold level; and
selecting, on the basis of said comparison, an output of all present plural-density format-transformer, i.e. the first plural-density format transformer or the first, second and third plural-density format-transformers.

11. A method for decoding an input coded bitstream into reconstructed output pictures, comprising the streams of:
receiving an input coded bitstream;
decoding, using a decoder, said input coded bitstream into quantized coefficient data;
dequantizing, using a dequantizer, the quantized coefficient data into decoded macroblock data;
transforming from among a plurality of density formats, using a first plural-density format-transformer, said decoded macroblock data into specific decoded macroblock data; and
a predictor loop, comprising the steps of:
transforming, using a second plural-density format-transformer, said decoded macroblock data into a specific decoded macroblock data;
storing said transformed specific decoded macroblock data in a reference memory to serve as a reference picture;
performing a motion compensated prediction on the basis of said reference picture stored in said frame memory to generate a motion compensated reference picture;
transforming the said motion compensated reference picture using a third plural-density format-transformer to generate a feedback output; and
applying said feedback output to an output of said dequantizer.

12. A method according to claim 11, wherein the transformation by one of the first plural-density format-transformer and by the first, second and third plural-density format-transformers depends on one of characteristics of said input coded bitstream, which comprise:
a color difference component, a luminance component and a quantized step size.

13. A video encoder according to claim 1, wherein the detector compares one of a color difference component in the input picture and a color difference component in the quantized picture, with a corresponding setting threshold level,
and on the basis of said comparison, selects outputs of all present plural-density format-transformers, i.e. the first plural-density format-transformer or the first, second and third plural-density format-transformers, respectively.

14. A video encoder according to claim 1, wherein the detector compares one of a luminance component in the input picture, a luminance in the quantized picture and a quantized step size measured in the coded bitstream, with a corresponding setting threshold level,
and on the basis of said comparison, selects outputs of all present plural-density format-transformers, i.e. the first plural-density format-transformer or the first, second and third plural-density format-transformers, respectively.

15. A video decoder according to claim 5, further having a detector for detecting a variation in one of a color difference component, a luminance component, a quantized step size, a value of a motion vector corresponding to a video encoder and a predicted error in the bitstream input, with reference to a setting level, and for obtaining the decoded picture by a selecting output of the first plural-density format-transformer or the first, second and third plural-density format-transformers, respectively.

16. A video decoding system, comprising a video decoder according to claim 5.

17. A method for encoding according to claim 9, wherein said step of detecting further comprises:
comparing one of a color difference component in the input-picture, a luminance component in the input picture, a color difference component in the quantized picture, a luminance component in the quantized picture, a value of a motion vector, a predicted error difference, and a quantized step size measured in the coded bitstream, with a corresponding setting threshold level; and
selecting, on the basis of said comparison, an output of all present plural-density format-transformer, i.e. the first plural-density format transformer or the first, second and third plural-density format-transformers.

18. A method according to claim 11,
wherein the transformation by one of the first plural-density format-transformer and by the first, second and third plural-density format-transformers depends on one of characteristics of said input coded bitstream, which comprise:
a color difference component, a luminance component and a quantized step size.

* * * * *